(12) United States Patent
Wolfson

(10) Patent No.: US 9,427,092 B2
(45) Date of Patent: Aug. 30, 2016

(54) NO-GLUE POCKETED SPRING UNIT CONSTRUCTION

(71) Applicant: Martin Wolfson, Dallas, TX (US)

(72) Inventor: Martin Wolfson, Dallas, TX (US)

( * ) Notice: Subject to any disclaimer, the term of this patent is extended or adjusted under 35 U.S.C. 154(b) by 0 days.

(21) Appl. No.: 14/562,365

(22) Filed: Dec. 5, 2014

(65) Prior Publication Data

US 2016/0007760 A1    Jan. 14, 2016

Related U.S. Application Data

(60) Provisional application No. 62/024,451, filed on Jul. 14, 2014.

(51) Int. Cl.
| | |
|---|---|
| A47C 27/00 | (2006.01) |
| A47C 27/07 | (2006.01) |
| A47C 27/06 | (2006.01) |
| B29C 65/22 | (2006.01) |
| B29C 65/00 | (2006.01) |
| B29C 65/38 | (2006.01) |
| B29L 31/00 | (2006.01) |

(52) U.S. Cl.
CPC ............. *A47C 27/07* (2013.01); *A47C 27/064* (2013.01); *B29C 65/221* (2013.01); *B29C 66/0044* (2013.01); *B29C 66/1122* (2013.01); *B29C 66/5227* (2013.01); *B29C 66/729* (2013.01); *B29C 66/8322* (2013.01); *B29C 66/8432* (2013.01); *B29C 65/38* (2013.01); *B29L 2031/751* (2013.01)

(58) Field of Classification Search
CPC ................................ A47C 27/00; A47C 27/07

USPC ............ 5/655.8, 720; 53/436, 438; 156/73.1
See application file for complete search history.

(56) References Cited

U.S. PATENT DOCUMENTS

| | | | |
|---|---|---|---|
| 4,401,501 A | * | 8/1983 | Stumpf .................... B68G 9/00 156/182 |
| 6,175,997 B1 | | 1/2001 | Mossbeck |
| 2002/0011698 A1 | | 1/2002 | Zysman |
| 2005/0257883 A1 | | 11/2005 | Anagnostopoulos |
| 2008/0282476 A1 | | 11/2008 | Lundevall |
| 2010/0011509 A1 | | 1/2010 | Stjerna et al. |
| 2014/0201924 A1 | * | 7/2014 | Wolfson ................. A47C 27/07 5/720 |

OTHER PUBLICATIONS

Korean Intellectual Property Office, International Search Report, Apr. 24, 2015.
Korean Intellectual Property Office, Written Opinion of the International Searching Authority, Apr. 24, 2015.

* cited by examiner

*Primary Examiner* — Fredrick Conley
(74) *Attorney, Agent, or Firm* — Seth A. Horwitz

(57) ABSTRACT

Methods and systems for no-glue pocketed spring unit construction. Rows of pocketed springs, preferably arranged into modules of more than two pocketed springs surrounding a central hole, are welded together when paired probes and anvils press layers of pocketed spring fabric from the rows of pocketed springs together and a welding pulse of current is transmitted through wires on the probes to heat the wire it is pressed against the fabric. Non-stick material interposed between the wires and the fabric prevents melted fabric from sticking to the wires.

20 Claims, 18 Drawing Sheets

NO-GLUE POCKETED SPRING UNIT CONSTRUCTION

CROSS-REFERENCE

This application is a non-provisional of, and claims priority from, U.S. Provisional App. No. 62/024,451, which is hereby incorporated by reference.

BACKGROUND

The present application relates to methods, devices and systems for no-glue construction of pocketed inner spring units, and more particularly to methods and systems for using Joule heating (welding using current-heated wire) to construct pocketed inner spring units.

Note that the points discussed below may reflect the hindsight gained from the disclosed inventions, and are not necessarily admitted to be prior art.

Connecting rows of pocketed springs together using a scrim sheet generally causes a trampoline-like effect, i.e., compressing springs in one part of the unit pulls on another part of the unit.

Glue connections between pocketed springs generally provide a "crunchier" feeling to a completed pocketed spring unit than connections made by thermal welding.

SUMMARY

The inventor has discovered surprising new approaches to methods and systems for manufacturing glueless pocketed spring cushioning units for use in mattresses and other cushioning assemblies. Rows of pocketed springs preferably comprise multi-pocketed spring modules, springs having uniform coil diameter, ones of said modules comprising more than two pocketed springs welded together to leave a central opening. Rows of pocketed springs are retained in position by pins, and are transferred to corresponding rows of probes and anvils which pinch layers of fabric together and form welds using current passed through heating elements on the probes.

BRIEF DESCRIPTION OF THE DRAWINGS

The disclosed inventions will be described with reference to the accompanying drawings, which show important sample embodiments and which are incorporated in the specification hereof by reference, wherein.

DETAILED DESCRIPTION OF SAMPLE EMBODIMENTS

Figure 1:
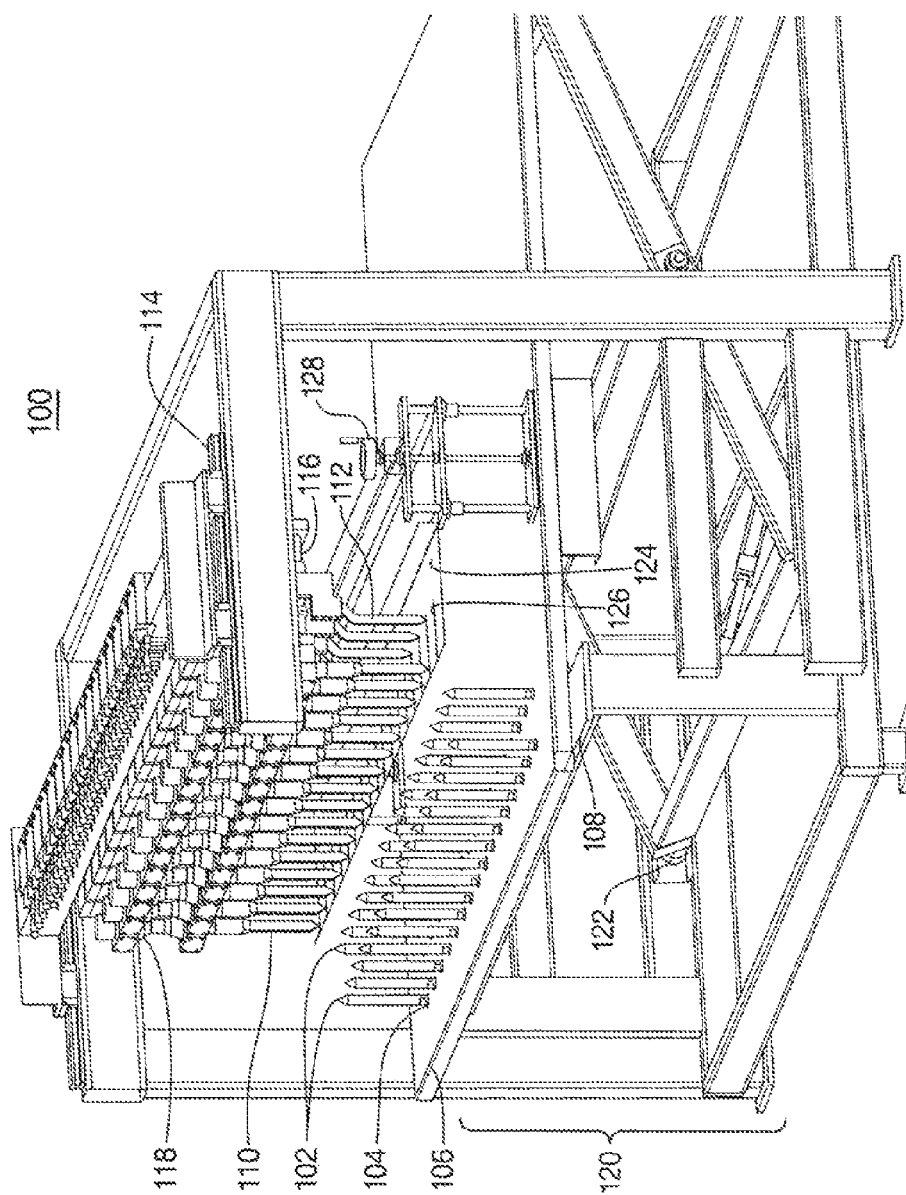
FIG. 1 schematically shows a machine for welding rows of pocketed spring modules to each other.

The present application discloses new approaches to constructing pocketed spring units. In particular, the inventor has developed various systems and methods for NO-GLUE construction of pocketed spring units.

The disclosed innovations, in various embodiments, provide one or more of at least the following advantages. However, not all of these advantages result from every one of the innovations disclosed, and this list of advantages does not limit the various claimed inventions.

- pocketed spring unit construction uses NO GLUE;
- pocketed spring units, and cushioning assemblies incorporating pocketed spring units, are more comfortable and luxurious-feeling;
- cost-effective welding of entire rows of pocketed springs, or of an entire cushioning unit;
- high cushioning unit manufacturing throughput;
- none of the connections in pocketed spring units are glue connections;
- reduced cost of pocketed spring unit construction;
- reduced cost of pocketed spring unit welding machines;
- stronger connections between rows of pocketed springs;
- reduced environmental impact of pocketed spring unit construction;
- reduced environmental impact of cushioning assembly construction and maintenance;
- rows of pocketed springs, or even an entire cushioning unit, can be fully welded together in a single weld event, with controllable vertical weld location, extent, width, and strength;
- reduced weight of pocketed spring unit;
- reduced weight of cushioning assembly;
- lower cushioning assembly transportation cost per unit;
- reduced likelihood of unmoored pockets;
- reduced likelihood of loose springs;
- increased cushioning unit durability; and
- enables unitary welds of the full vertical extent of pocketed spring modules.

The numerous innovative teachings of the present application will be described with particular reference to presently preferred embodiments (by way of example, and not of limitation). The present application describes several inventions, and none of the statements below should be taken as limiting the claims generally.

The inventor has discovered surprising new approaches to methods and systems for manufacturing glueless pocketed spring cushioning units for use in mattresses and other cushioning assemblies. Rows of pocketed springs preferably comprise multi-pocketed spring modules, springs having uniform coil diameter, ones of said modules comprising more than two pocketed springs welded together to leave a central opening. Rows of pocketed springs are retained in position by pins, and are transferred to corresponding rows of probes and anvils which pinch layers of fabric together and form welds using current-heated wires in the probes.

"Cushioning assembly" and "cushioning unit" are defined herein as any cushioning structure incorporating pocketed springs, e.g., a mattress, couch or cushion.

"Heating element" is used herein to refer to a length of material, preferably a wire (e.g., steel or other metal wire), that will repeatably produce approximately the same temperature when approximately the same current is passed through it for approximately the same amount of time (using Joule heating, also called ohmic heating herein). "Approximately the same" temperature, current and time meaning sufficiently bounded to produce results within tolerances of cushioning unit product requirements and/or specifications.

In preferred embodiments, pockets are formed gluelessly by welding together layers of a flexible material, generally plastic, such as spun bonded polypropylene weighing 1.5 ounces per square yard, using Joule heating effected by current passed through a heating element compressed against the fabric. By forming pockets of a chosen size on a chosen length and width of fabric, rows of pockets of a chosen length and sized for a chosen diameter and length of spring can be produced.

In preferred embodiments, uniform diameter springs are used. Uniform diameter springs can be manufactured by custom winding high tensile strength wire with highly uniform shape and thickness.

Some embodiments use or include microcoil springs, which are small springs suitable for use in pocketed spring units incorporated into, for example, upholstery.

Springs are inserted into pockets to form pocketed springs. Springs can be inserted into pockets oriented horizontally through a seam on top of the pocket, and then beaten until they reorient vertically. Generally, this results in a pocketed spring that, in a completed cushioning assembly, can only be oriented in a single direction. For example, a bed made in this way is typically called "one sided".

Preferably, springs are inserted oriented vertically through a seam on the side and allowed to expand to fill the pocket.

Pockets can be fashioned to be shorter than an uncompressed spring, so that pocketed springs are constantly under load ("preloaded"). This generally increases the useful lifetime of the spring, by allowing its spring constant to remain higher, for longer. Preloaded springs are generally inserted vertically compressed, and allowed to expand vertically to fill the pocket.

A row of pocketed springs, in which pocketed springs are connected to adjacent pocketed springs (e.g., by the same fabric that forms the pockets) can be formed as shown and described in, for example, U.S. Pat. No. 6,260,331.

Rows of pocketed springs can be fashioned into rows of multi-pocket "modules", comprising more than two—preferably, four—pockets welded together to leave an opening (a hole) in the middle. Rows of modules can then be welded together, and those rows can then be welded to each other to form pocketed spring units. Pocketed spring modules can be assembled as shown and described in, for example, U.S. Pat. No. 6,347,423. Preferably, openings have uniform spacing from each other. This can be accomplished by, e.g., nearest-adjacent (not catty-corner) springs in modules having uniform spacing from each other, and modules having uniform spacing from each other.

Multiple horizontally-adjacent rows of pocketed springs can be connected together to form pocketed spring cushioning units. Generally, pocketed spring units look like arrays of pocketed springs from above.

Springs in completed pocketed spring units are typically compressed very flat and rolled up into tight cylinders for shipping.

Glue can be used in layers of a cushioning assembly manufactured as disclosed herein, but preferably is not used in the pocketed spring cushioning unit layer(s) assembled using thermal welds.

FIG. 1 schematically shows a machine 100 for welding rows of pocketed spring modules 200 to each other. In FIG. 1, the machine is in an initial position, without pocketed spring modules 200. Two rows of upward-facing vertical positioning pegs 102 are disposed to penetrate holes 104 in a liftable table 106, are attached to a stable surface 108 beneath the liftable table 106, and are configured to hold two rows of pocketed spring modules 200 in position (see, e.g., FIG. 2). Rows of pegs 102 are aligned so that a line through a row of pegs 102 is perpendicular to a line between two adjacent pegs 102 in two different rows. (The left-most row of pegs 102 and row of pocketed spring modules 200 in the figures, generally closest to a module 200 entrance side of the machine 100, will be called herein the "front-most" rows. The right-most rows, generally closest to a cushioning unit exit side of the machine 100, will be called the "far-most" rows. Corresponding directions on the machine are "front-ward" and "far-ward".)

As shown in FIG. 1, the front row of downward facing phalanges are the probes 110, and the far-most row of downward facing phalanges are anvils 112. Advantageously, the probes 110 and the anvils 112 are spaced at approximately the same intervals as the upward-facing pegs 102, and are positioned so that when they are moved (e.g., on a rail system 114, as shown) front-wards to their front-most position, they vertically align with the pegs 102.

Figure 13A:
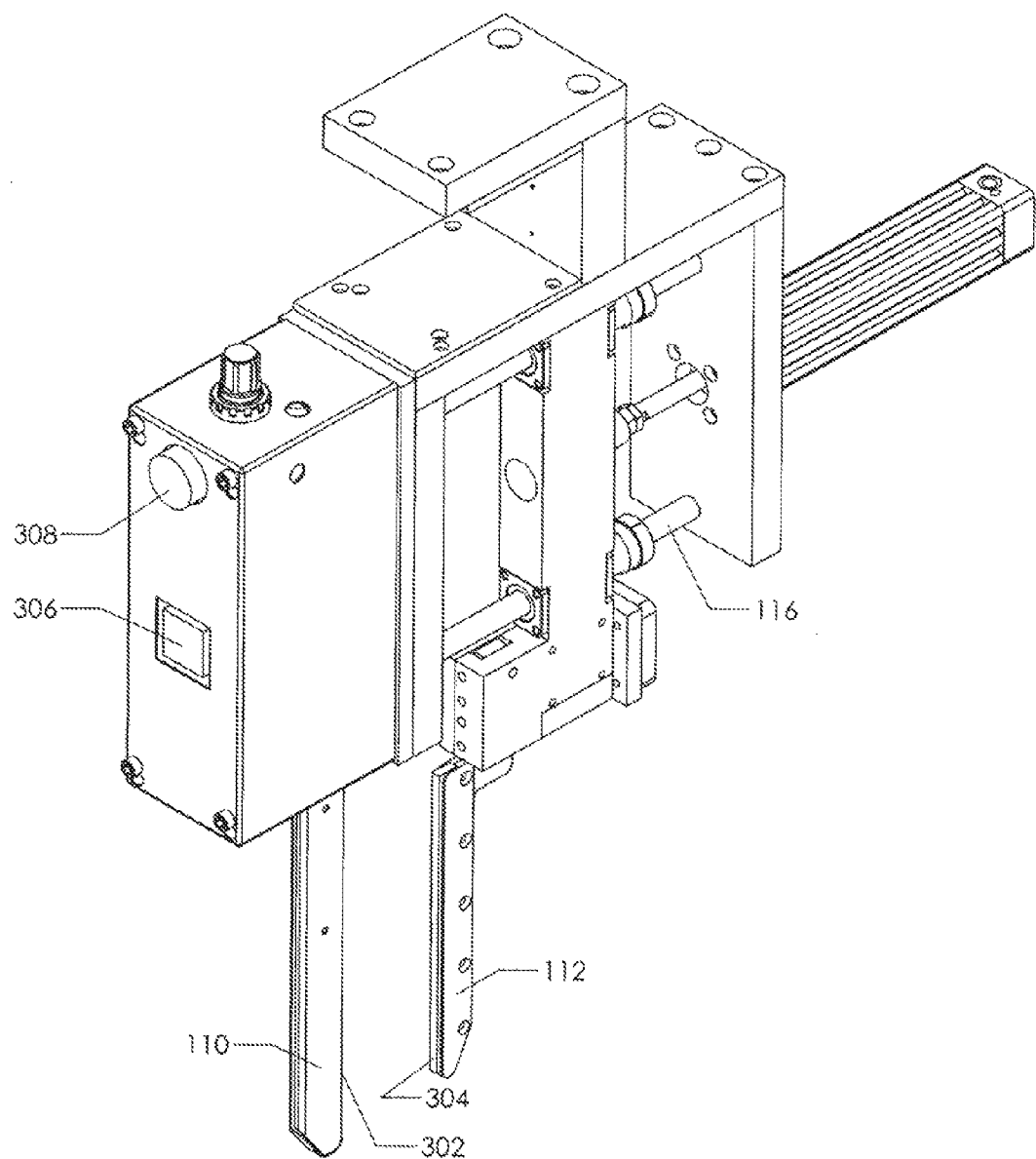
FIG. 13A schematically shows a sealing head for welding rows of pocketed spring modules to each other.
Figure 13B:
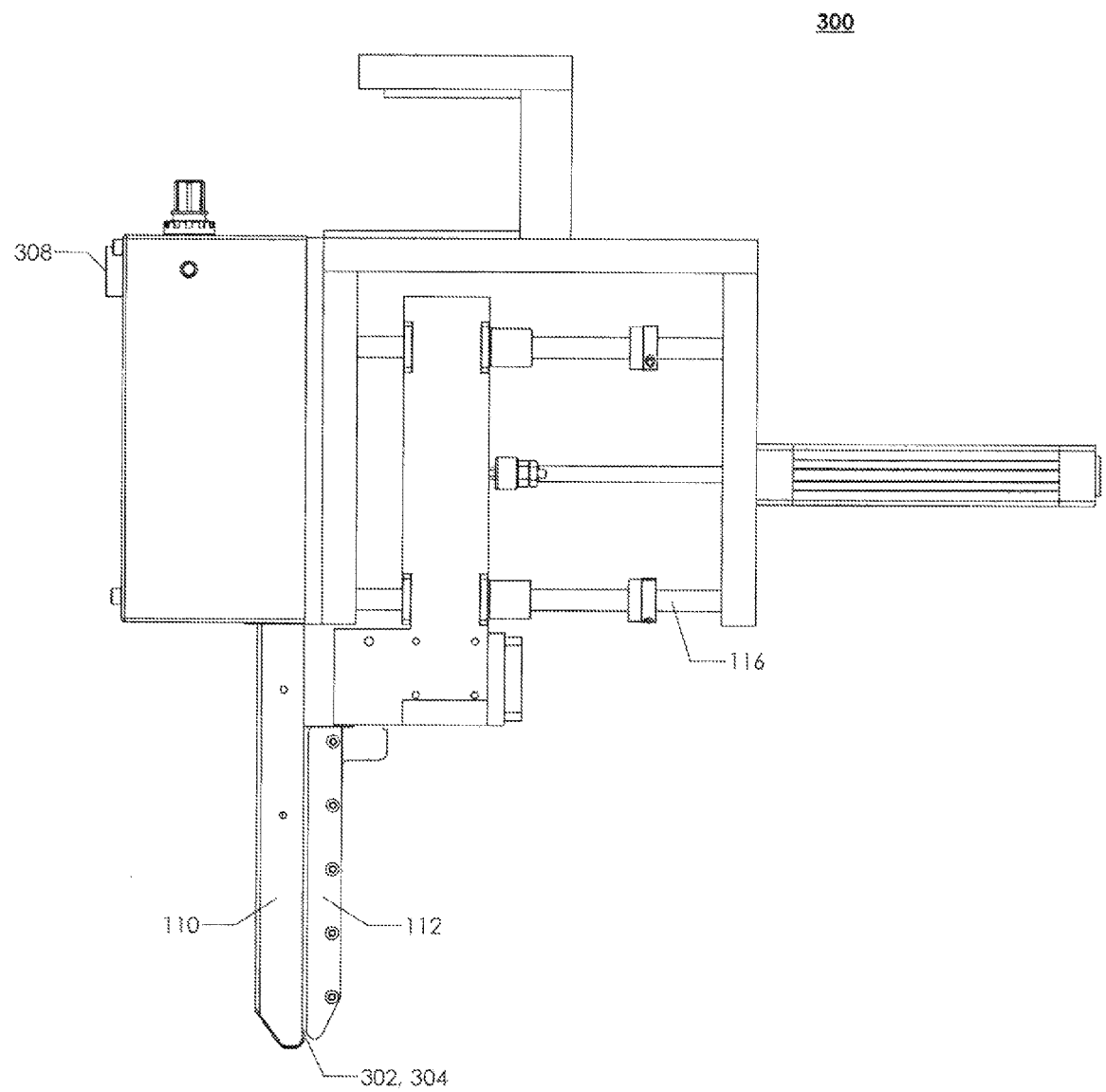
FIG. 13B schematically shows a sealing head for welding rows of pocketed spring modules to each other.
Figure 14A:
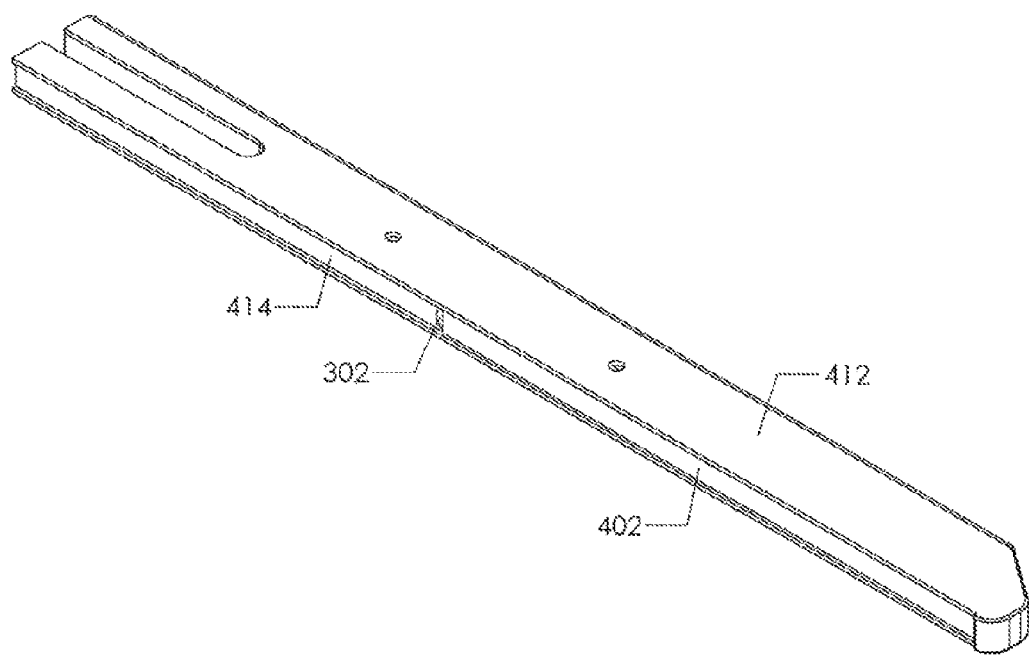
FIG. 14A schematically shows a probe.
Figure 14B:
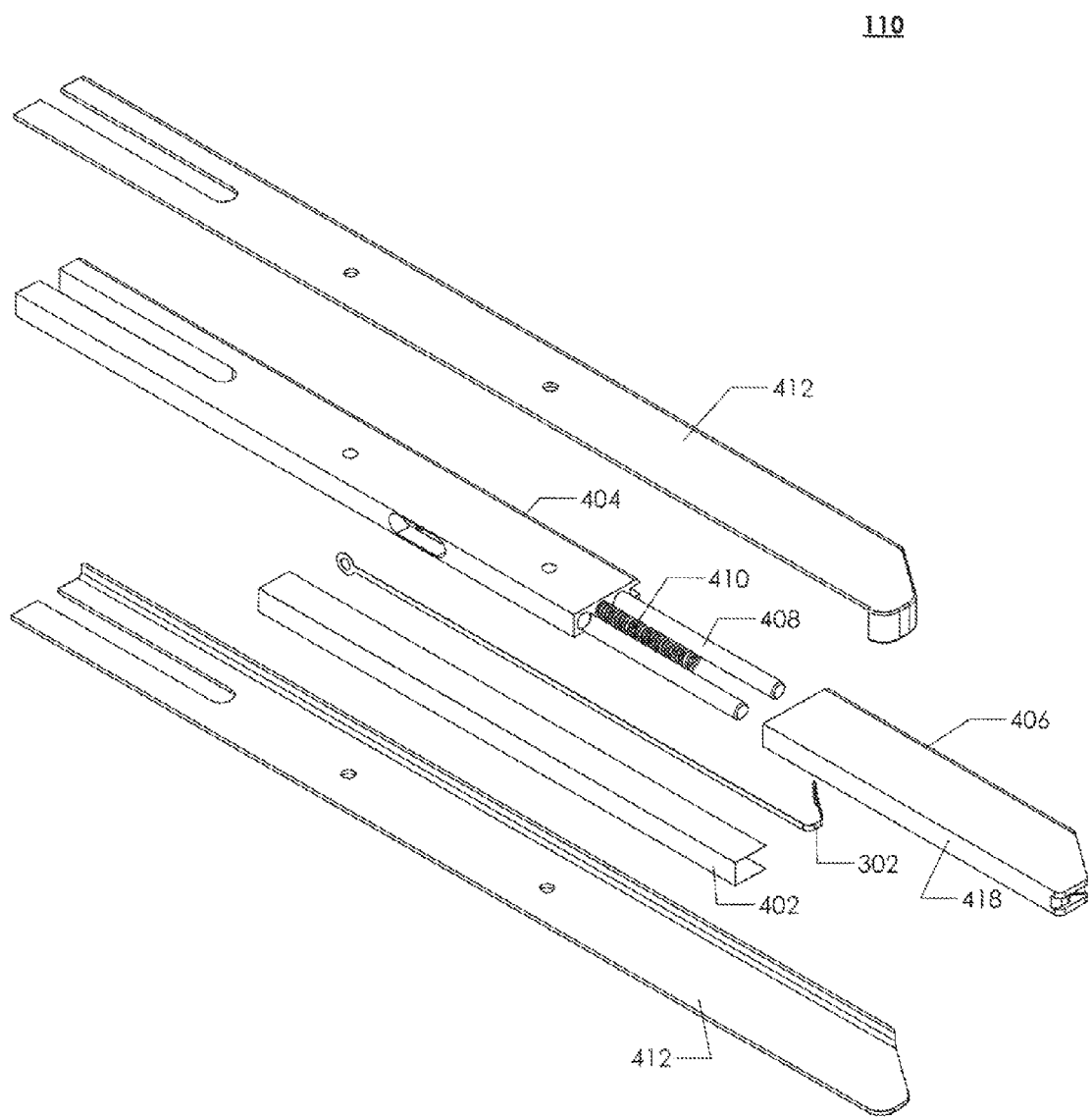
FIG. 14B schematically shows an exploded view of a probe.
Figure 15:
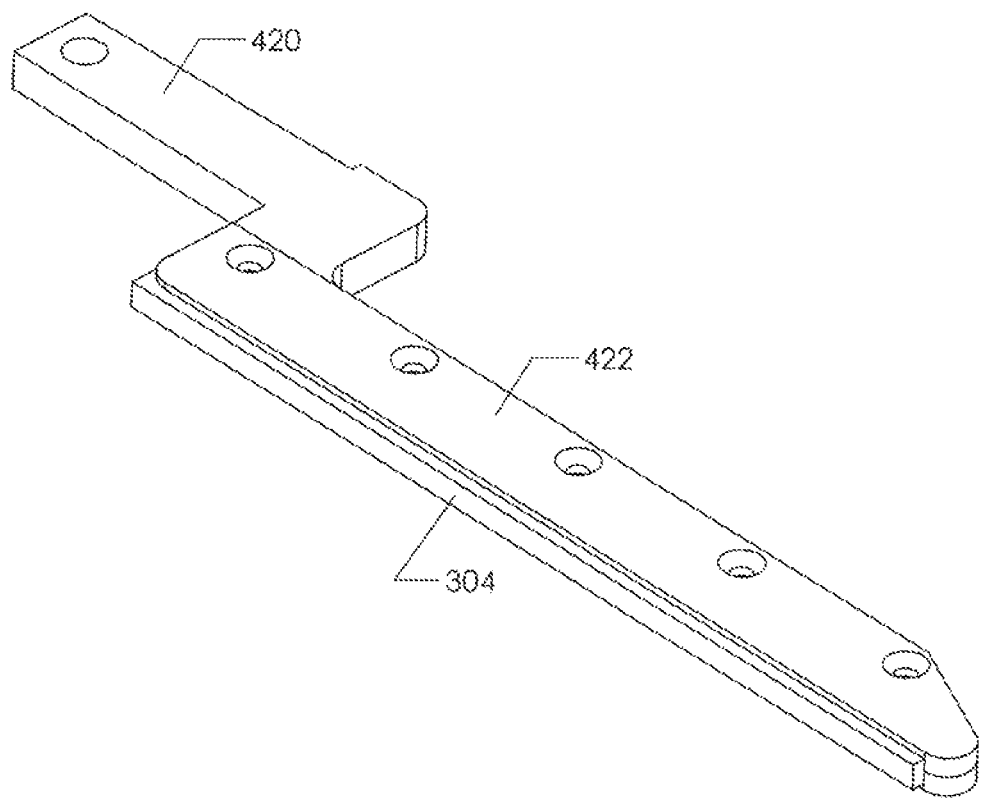
FIG. 15 schematically shows an anvil.

Probe 110/anvil 112 pairs are configured to compress and heat the plastic fabric of the pockets to a pressure and temperature suitable for welding together multiple layers (generally two or more layers) of the plastic fabric. Preferably, probes 110 are embodied as shown in FIGS. 14A and 14B; anvils 112, as shown in FIG. 15; and sealing heads 300, comprising (inter alia) probes 110, anvils 112, and a rail system 116 (or other transport) to open and close them, as shown in FIGS. 13A and 13B.

Preferably, the heating element 302 on a probe 110 is located on a long, fabric-facing side of the probe 110 oriented towards a corresponding anvil (as shown, a horizontally-facing side). This simplifies the mechanical operation of the probes 110 and anvils 112 inserting into the central openings (holes 202) in individual modules 200 and pressing together, so that the one or more contact regions 304 on the anvils 112 and the heating elements 302 on the probes 110 press together with the spring pocket fabric between, allowing welding in the location(s) corresponding to the contact region(s) 304.

Welding occurs when a probe 110 and an anvil 112 move together (preferably, multiple probe 110/anvil 112 pairs simultaneously), and the heating element 302 in the probe 110 and a facing surface of a corresponding anvil 112 (a contact region 304) press flush against each other, with the layers of fabric to be welded pressed between them. The heating element 302 is then activated with a welding pulse at a (1) current, (2) for a time and (3) at an amount of pressure between the probe 110 and the anvil 112 selected to weld the particular density and thickness of plastic fabric of the pockets to a desired weld strength. The probes 110 and anvils 112 can be pushed together by, e.g., a rail system 116 (as shown in FIG. 1, a rail system 116 using air actuators separate from the rail system 114 that moves the probes 110 and anvils 112 front-ward and far-ward together).

Spacing of pegs 102, probes 110 and anvils 112 can be adjustable to correspond to, e.g., module 200 diameter and hole 104 placement.

The table 106 through which the pegs 102 are disposed includes a lift mechanism 120 to push the liftable table 106 upwards; the upward-moving table 106 pushes upwards rows of pocketed spring modules 200 disposed on the pegs 102. The lift mechanism 120 shown in FIG. 1 comprises servo motors 122. The table 106 also includes an extractor plate 124, described in more detail with respect to FIGS. 6 and 8.

Figure 2:
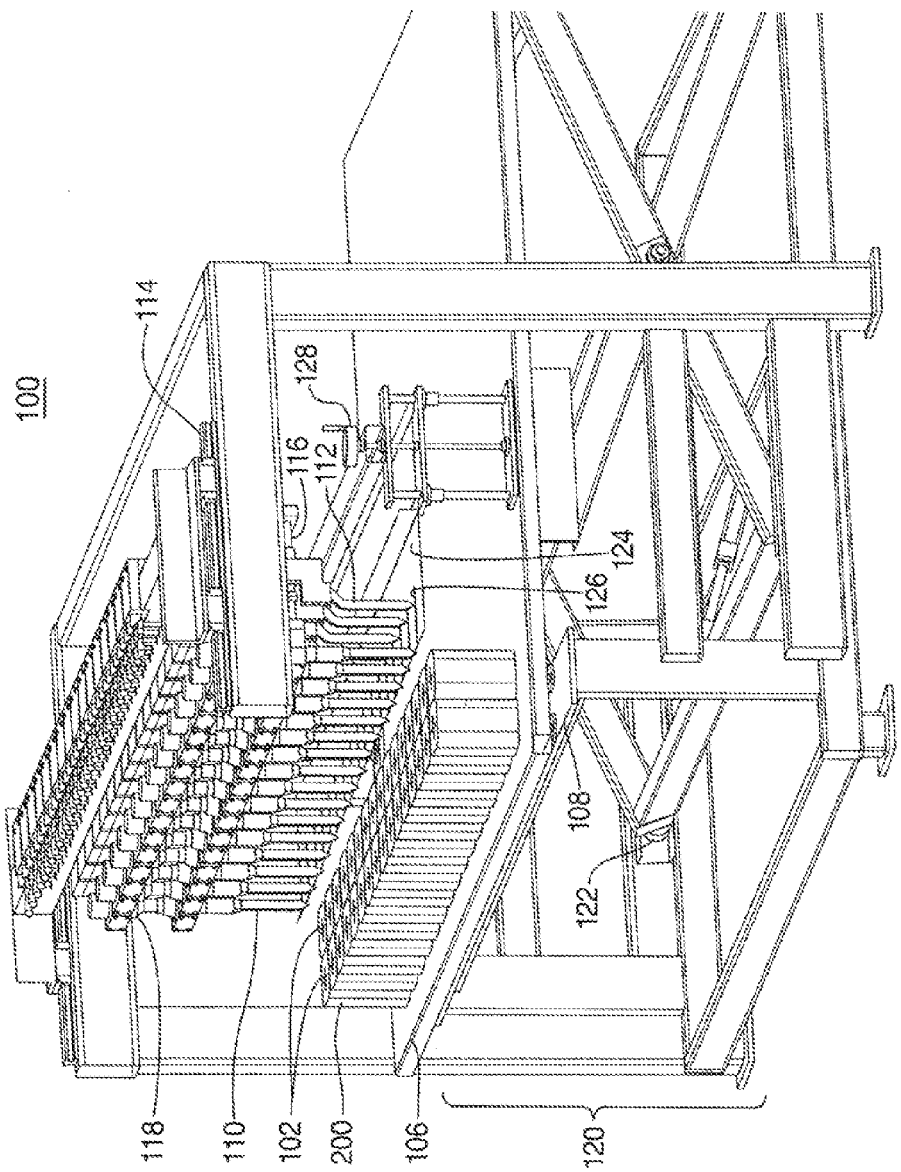
FIG. 2 schematically shows a machine for welding rows of pocketed spring modules to each other.

FIG. 2 schematically shows a machine 100 for welding rows of pocketed spring modules 200 to each other. In embodiments as shown in FIG. 2, rows of pocketed spring modules 200 are disposed on, and spatially aligned by, the pegs 102. Here, pocketed spring modules 200 comprise four pocketed springs. Preferably, two rows of pocketed springs are welded together to form modules 200 prior to the modules 200 being loaded onto the machine 100, allowing entire rows of modules 200 to be treated as individual, separate units.

Module holes 202 are aligned with pegs 102, and rows of modules 200 are dropped or pushed onto corresponding rows of pegs 102. Advantageously, springs within the pockets are of uniform size, and modules 200 are spaced a uniform distance from each other. Uniform sizing can be advantageously enhanced by using springs made from high tensile wire of even thickness and consistent shape, and by using substantially the same length of wire to form each coil.

Figure 3:
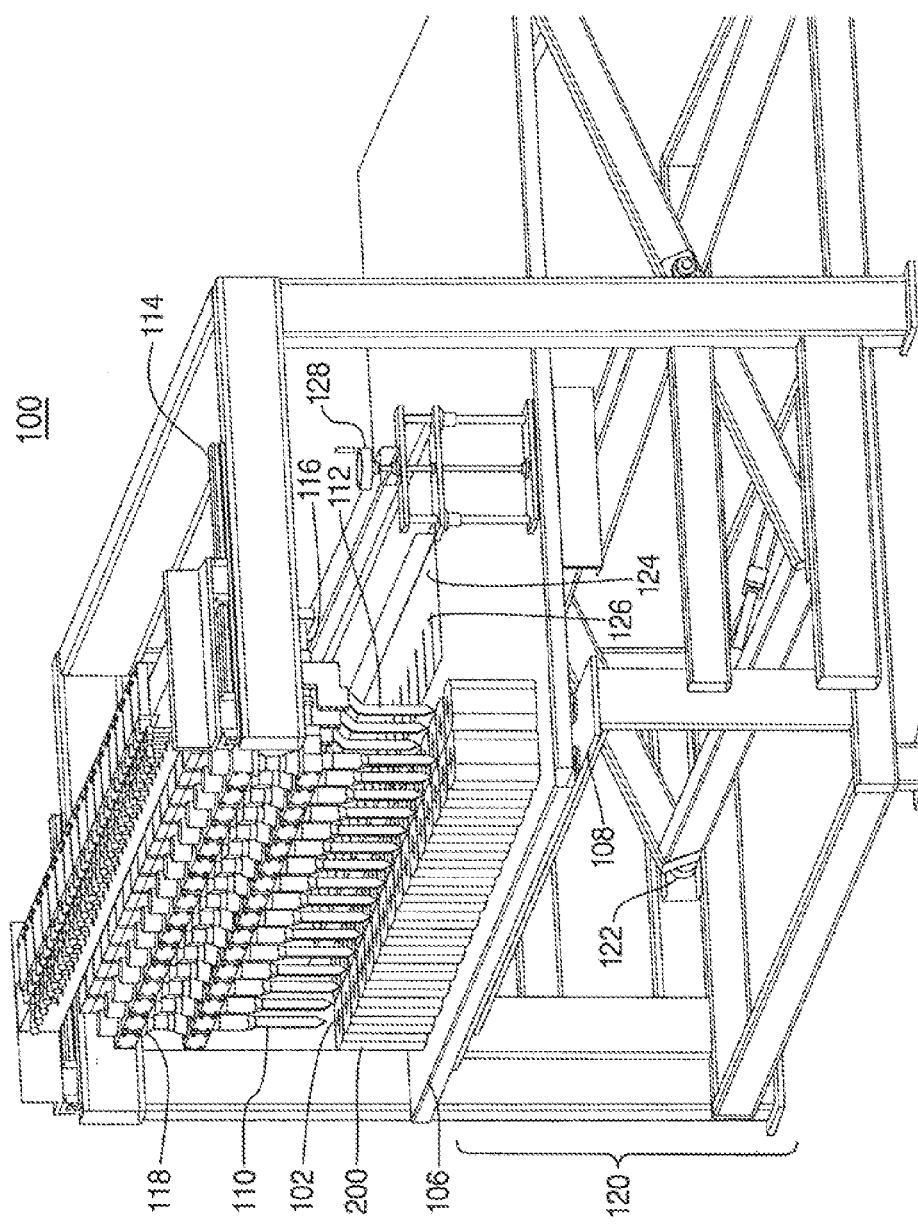
FIG. 3 schematically shows a machine for welding rows of pocketed spring modules to each other.

FIG. 3 schematically shows a machine 100 for welding rows of pocketed spring modules 200 to each other. As shown in FIG. 3, the probes 110 and anvils 112 move leftward together to be vertically aligned over the pegs 102, and thus also over the holes 202 described by the middles of the pocketed spring modules 200.

Figure 4:
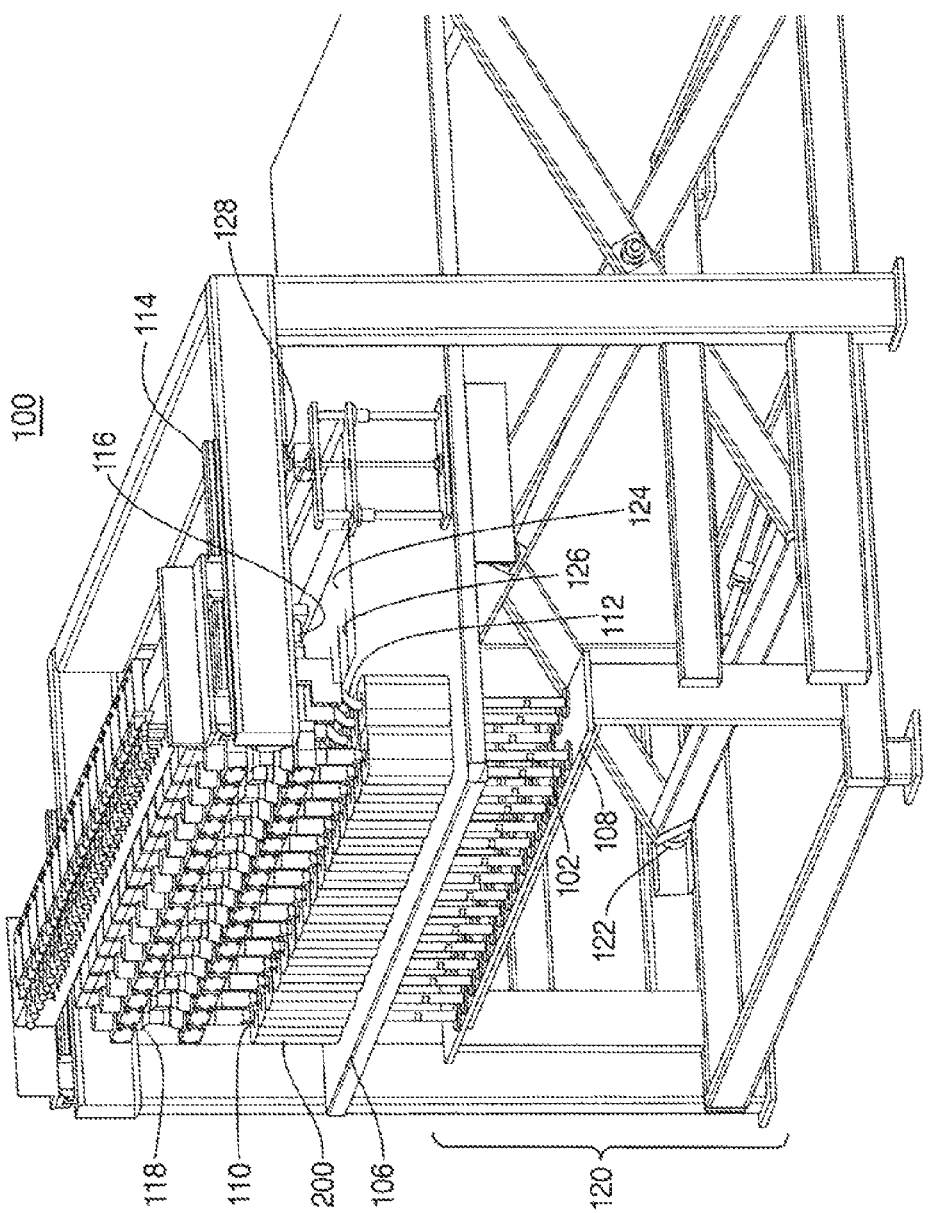
FIG. 4 schematically shows a machine for welding rows of pocketed spring modules to each other.

FIG. 4 schematically shows a machine for welding rows of pocketed spring modules 200 to each other. As shown in FIG. 4, the liftable table 106 has risen, pushing the rows of pocketed spring modules 200 onto the corresponding probes 110 and anvils 112 and off of the pegs 102.

Figure 5:
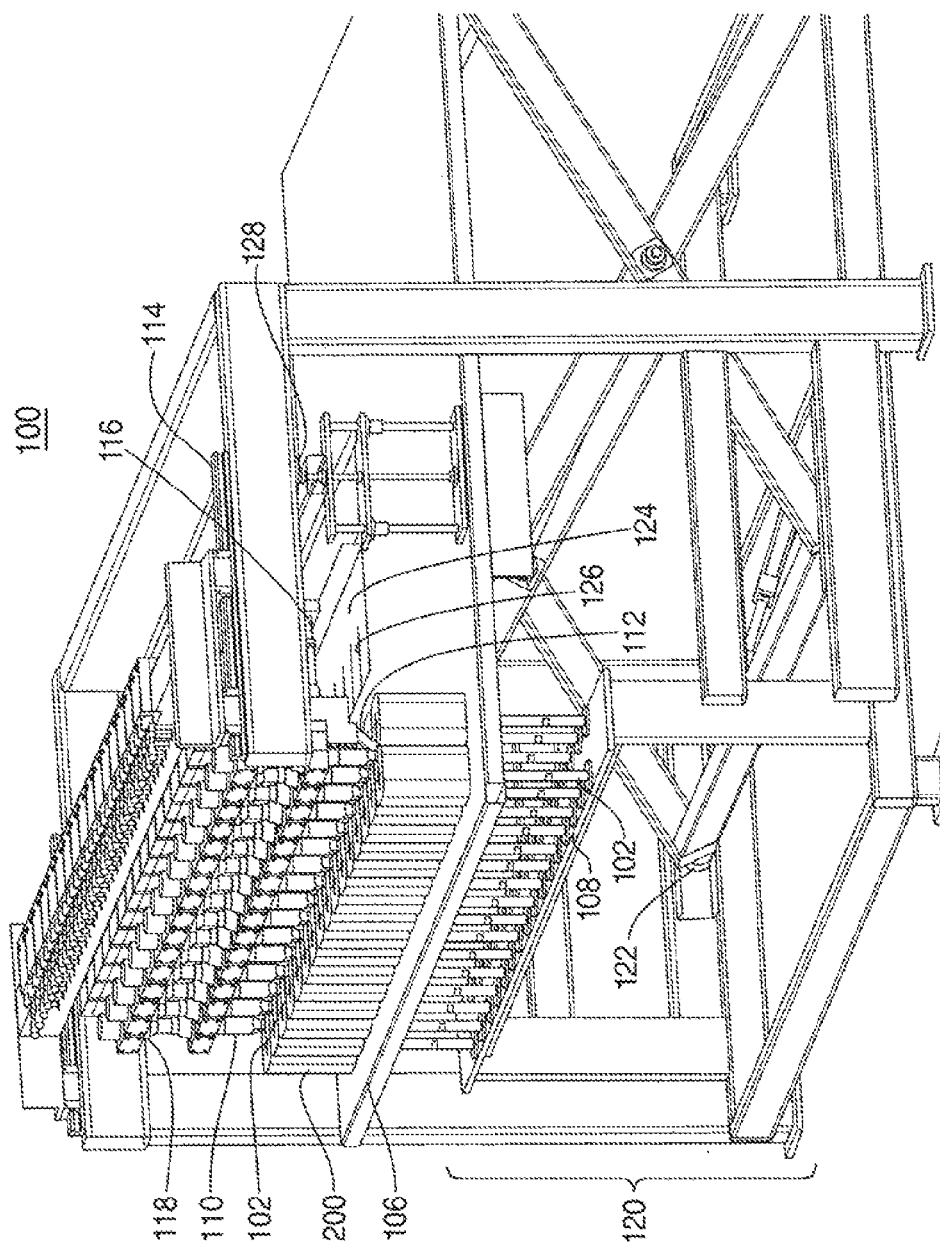
FIG. 5 schematically shows a machine for welding rows of pocketed spring modules to each other.

FIG. 5 schematically shows a machine 100 for welding rows of pocketed spring modules 200 to each other. As shown in FIG. 5, the probes 110 and anvils 112 are pushed together to perform a weld and to move the rows of modules 200 to a dropoff position where the probes 110 are aligned over a far row of pegs 102. Preferably, the probes 110 and anvils 112 perform a weld while moving the modules into the dropoff position.

As shown in FIG. 5, the probes 110 and anvils 112 push together the fabric between them (and between two corresponding pairs of pocketed springs in different rows of pocketed spring modules 200). When a suitable pressure has been achieved, a welding pulse of current is propagated through the heating elements 302 in the probes 110, heating the fabric to the point of melting together the layers of fabric compressed by respective probes 110 and anvils 112. A non-stick material with a higher melting point than the fabric (e.g., Teflon, or a high-temperature plastic coated with Teflon or a similar material), interposed between the heating elements 302 and the fabric, keeps the melted fabric from sticking to the heating elements 302. The vertical position of the region(s) where the heating elements 302 in the probes 110 and the contact region(s) 304 in the anvils 112 press flush against each other during welding generally corresponds to the vertical position of the weld. Preferably, the heating elements 302 and the contact regions 304 span the entire vertical extent of the plastic fabric between the probes 110 and anvils 112.

Generally, the probes and anvils can place welds anywhere along a vertical line on the pocket fabric. Further, the strength of said welds is tunable by controlling the welding pulse current-time curve and the amount of pressure exerted by the probe against the corresponding anvil (with the pocket fabric therebetween). Different numbers, vertical placements and widths of welds can also be used to control use characteristics, such as firmness, of the resulting cushioning unit.

Figure 6:
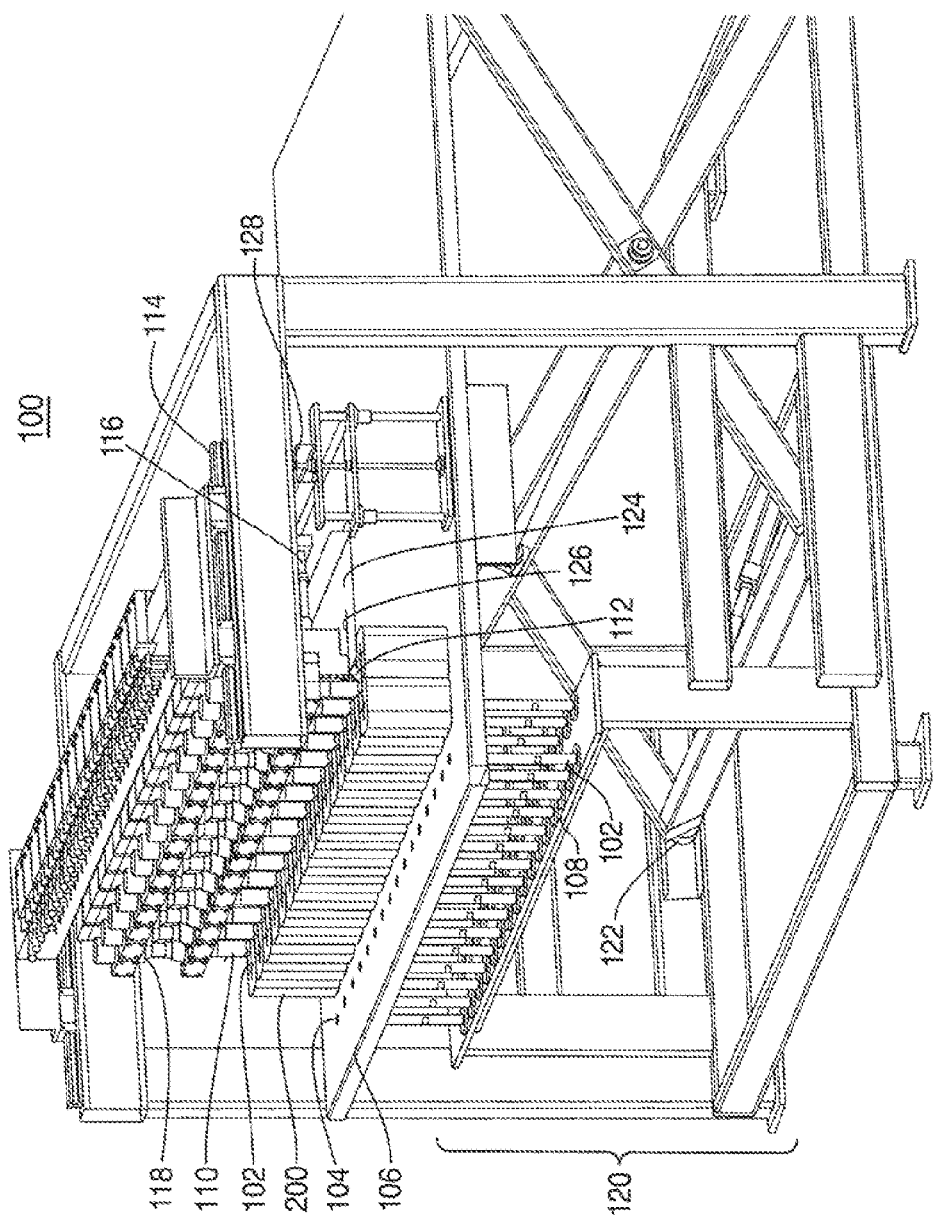
FIG. 6 schematically shows a machine for welding rows of pocketed spring modules to each other.

FIG. 6 schematically shows a machine 100 for welding rows of pocketed spring modules 200 to each other. In FIG. 6, the probes 110 and anvils 112 have moved, pushing the now welded together modules 200 so that the openings in the frontward row of modules 200 are aligned over the far row of pegs 102. This places a far edge (or more) of the far row of pocketed spring modules 200 (as shown in FIG. 6, the row of modules 200 currently on the row of anvils 112) under the extractor plate 124.

Figure 7:
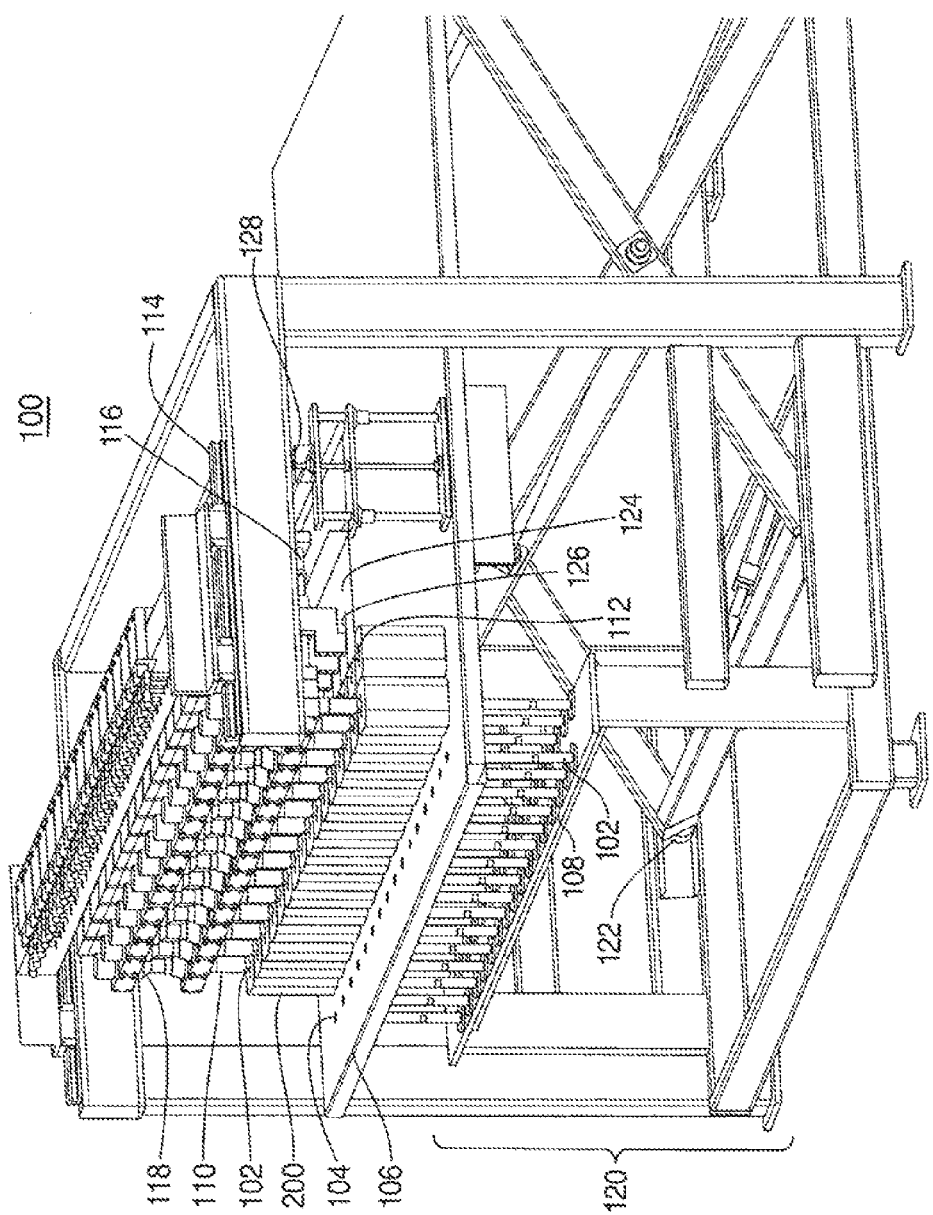
FIG. 7 schematically shows a machine for welding rows of pocketed spring modules to each other.

The extractor plate 124 has holes 126 corresponding to the locations of the probe 110 and the anvil 112; as shown in FIGS. 6 and 7, the holes 126 partially or fully surround the anvils 112 and/or the probes 110 when a front row of modules 200 is in position to be transferred to the far row of pegs 102.

FIG. 7 schematically shows a machine 100 for welding rows of pocketed spring modules 200 to each other. In FIG. 7, the probes 110 and anvils 112 have separated and moved back to their original relative position, with the probes 110 now located over the far row of pegs 102.

Figure 8:
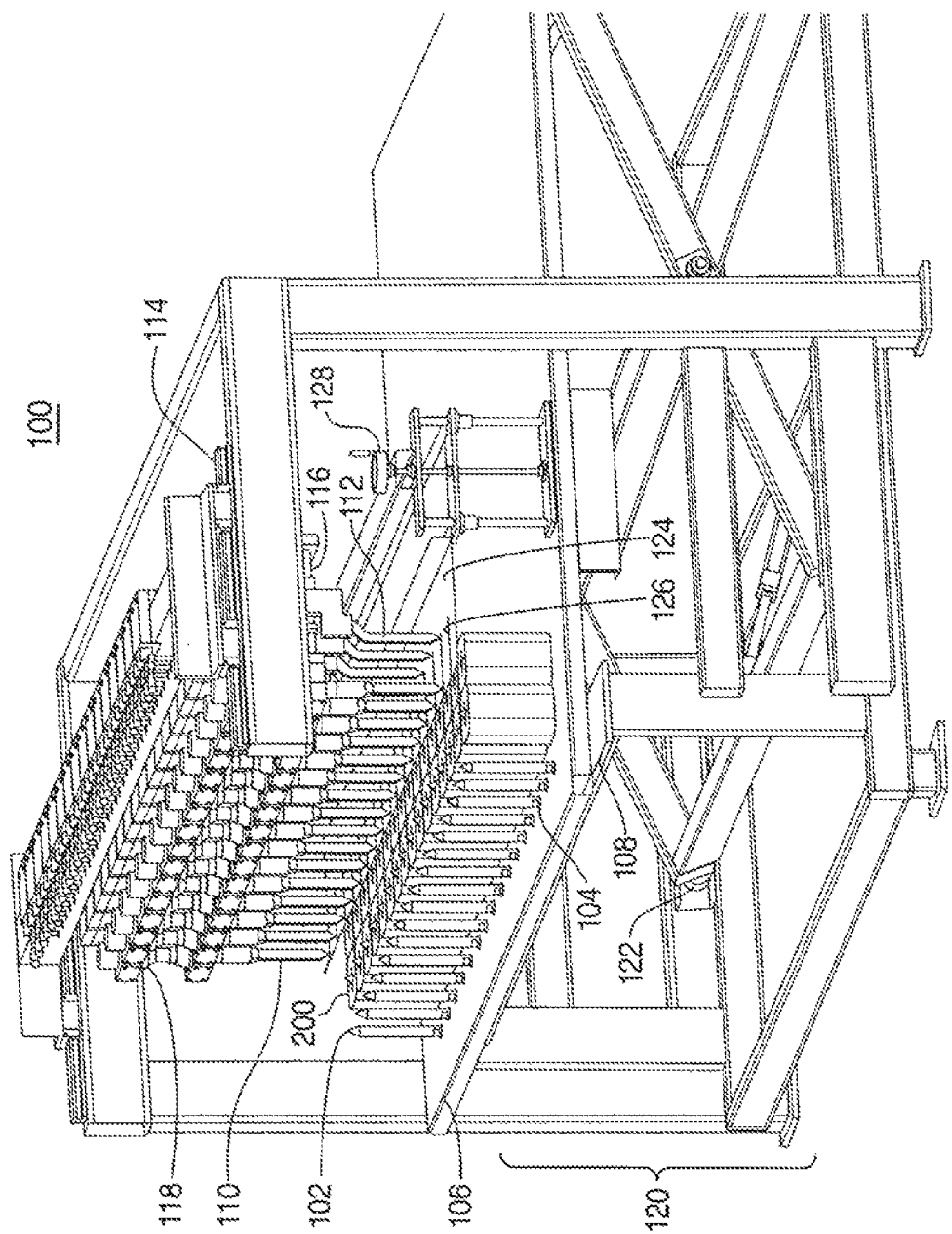
FIG. 8 schematically shows a machine for welding rows of pocketed spring modules to each other.

FIG. 8 schematically shows a machine 100 for welding rows of pocketed spring modules 200 to each other. The liftable table 106 is connected to, and rises and falls with, the extractor plate 124, which is oriented approximately parallel to the liftable table 106. When the table is lowered as shown in FIG. 8, the extractor plate 124 lowers too, pushing the now-joined rows of pocketed spring modules 200 off the probe 110 and the anvil 112, and pushing the holes 202 of the front row of pocketed spring modules 200 onto the far row of pegs 102 (as explained above, the probes 110 were located over the pegs 102 in FIG. 7). A crank 128 can be used to adjust the height of the liftable table 106 to correspond to the height of the pocketed spring modules 200.

Figure 9:
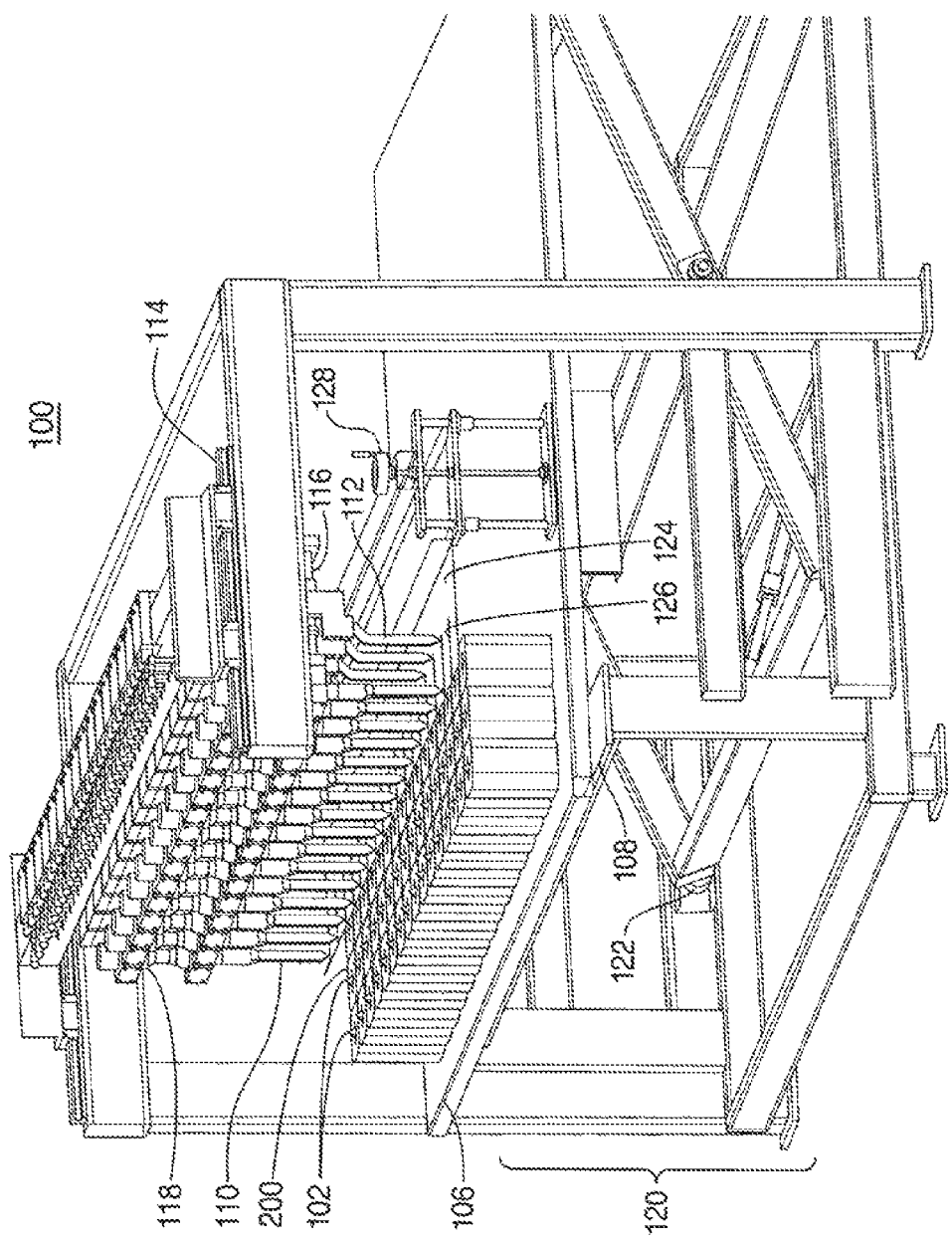
FIG. 9 schematically shows a machine for welding rows of pocketed spring modules to each other.

FIG. 9 schematically shows a machine 100 for welding rows of pocketed spring modules 200 to each other. In FIG. 9, a new row of pocketed spring modules 200 has been placed on the front row of pegs 102 by positioning the holes 202 of the modules 200 over the pegs 102 and dropping or pushing the row of modules 200 onto the pegs 102 (or otherwise inserting the pegs 102 into the holes 202).

Figure 10:
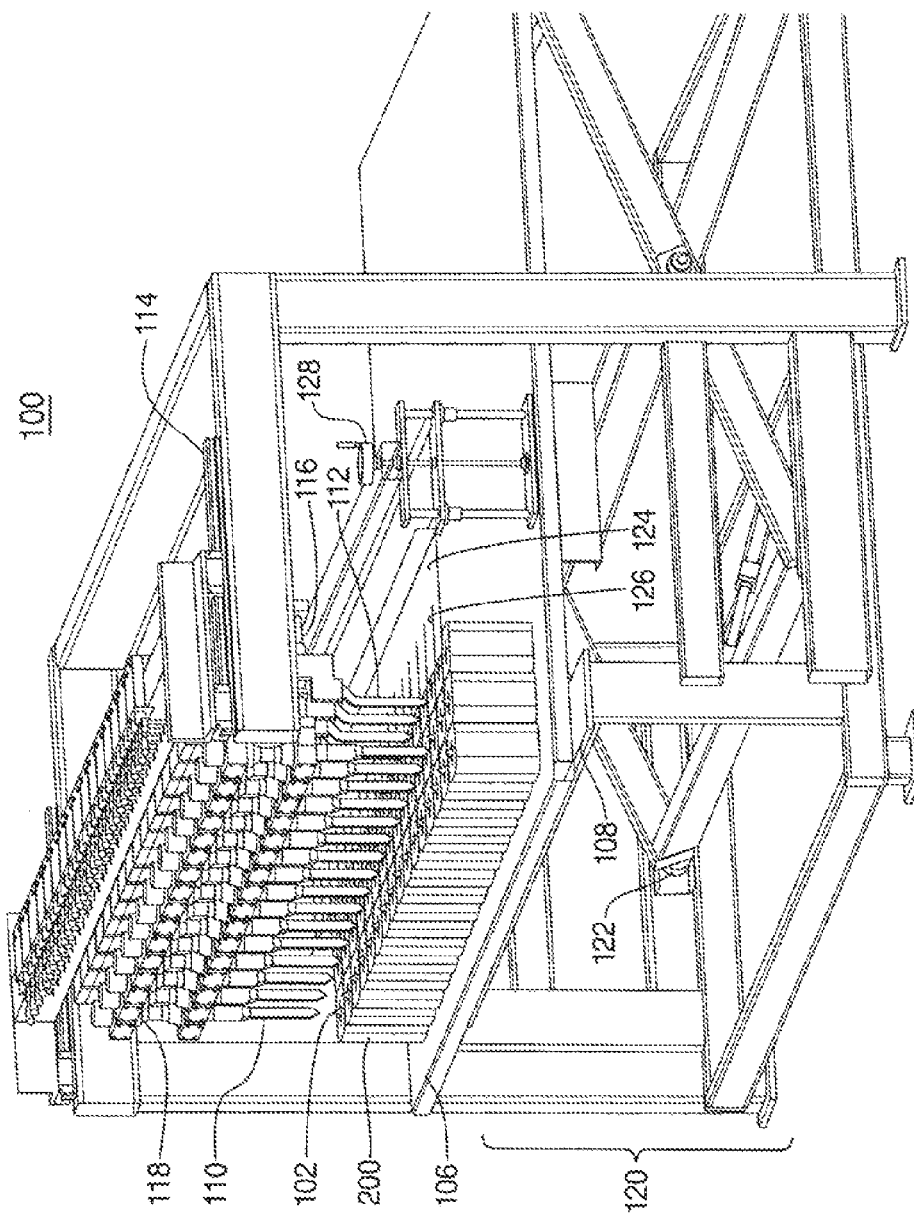
FIG. 10 schematically shows a machine for welding rows of pocketed spring modules to each other.

FIG. 10 schematically shows a machine 100 for welding rows of pocketed spring modules 200 to each other. In FIG. 10, the probes 110 and anvils 112 have moved to vertically align with the front and rear rows of pegs 102, respectively. This point in the process corresponds to FIG. 3, but with one far-most (right-most) row of pocketed spring modules 200 already welded to the middle row of pocketed spring modules 200 with a number of no-glue connections.

Figure 11:
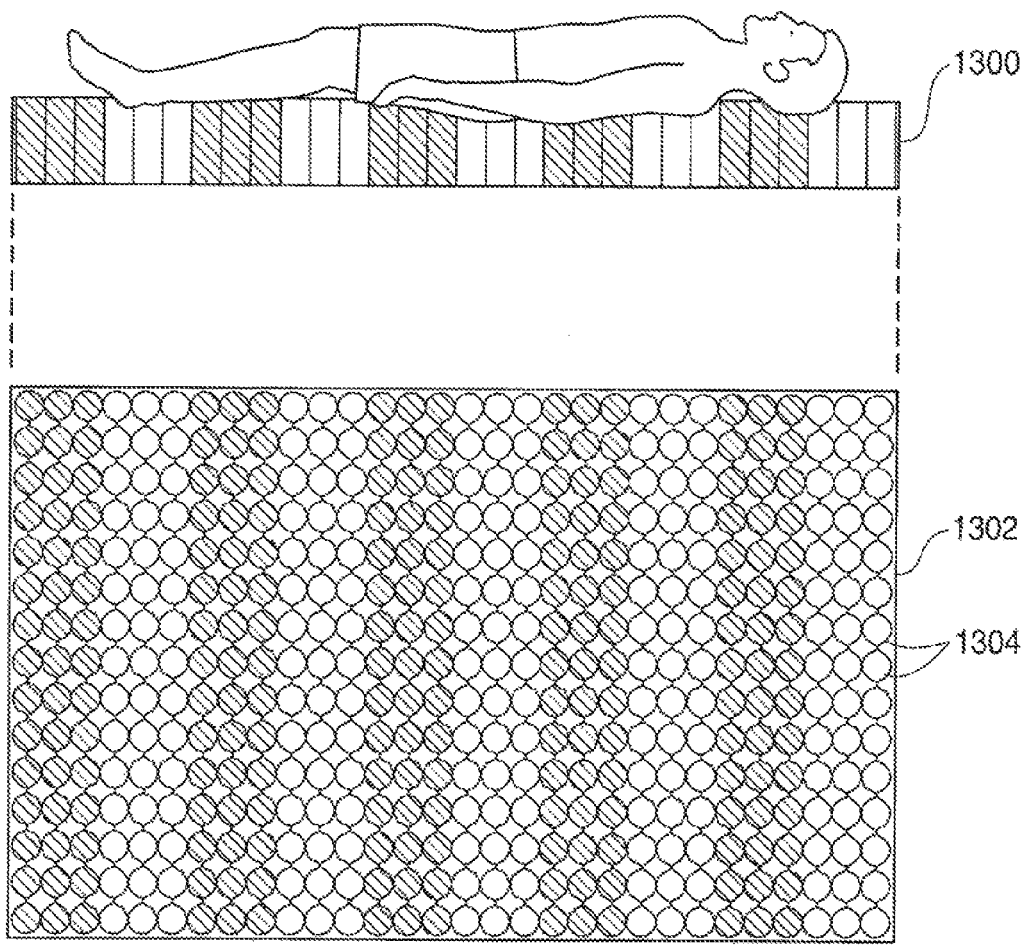
FIG. 11 schematically shows an example of a mattress which has a core of many pocketed spring units which are mechanically joined together without glue, using a process like that shown in FIGS. 1-10.

FIG. 11 schematically shows a mattress 1300. Generally, a mattress 1300 comprises a core 1302, upholstery and a fabric cover (typically called ticking). The core 1302 provides support for a user, upholstery cushions the core 1302, and the fabric cover is wrapped around the core 1302 and upholstery and contributes both aesthetics and texture to the surface of the mattress 1300.

In preferred embodiments, the core 1302 comprises many pocketed spring units 1304. The upholstery can also comprise pocketed spring units, such as pocketed microcoil spring units.

Figure 12:
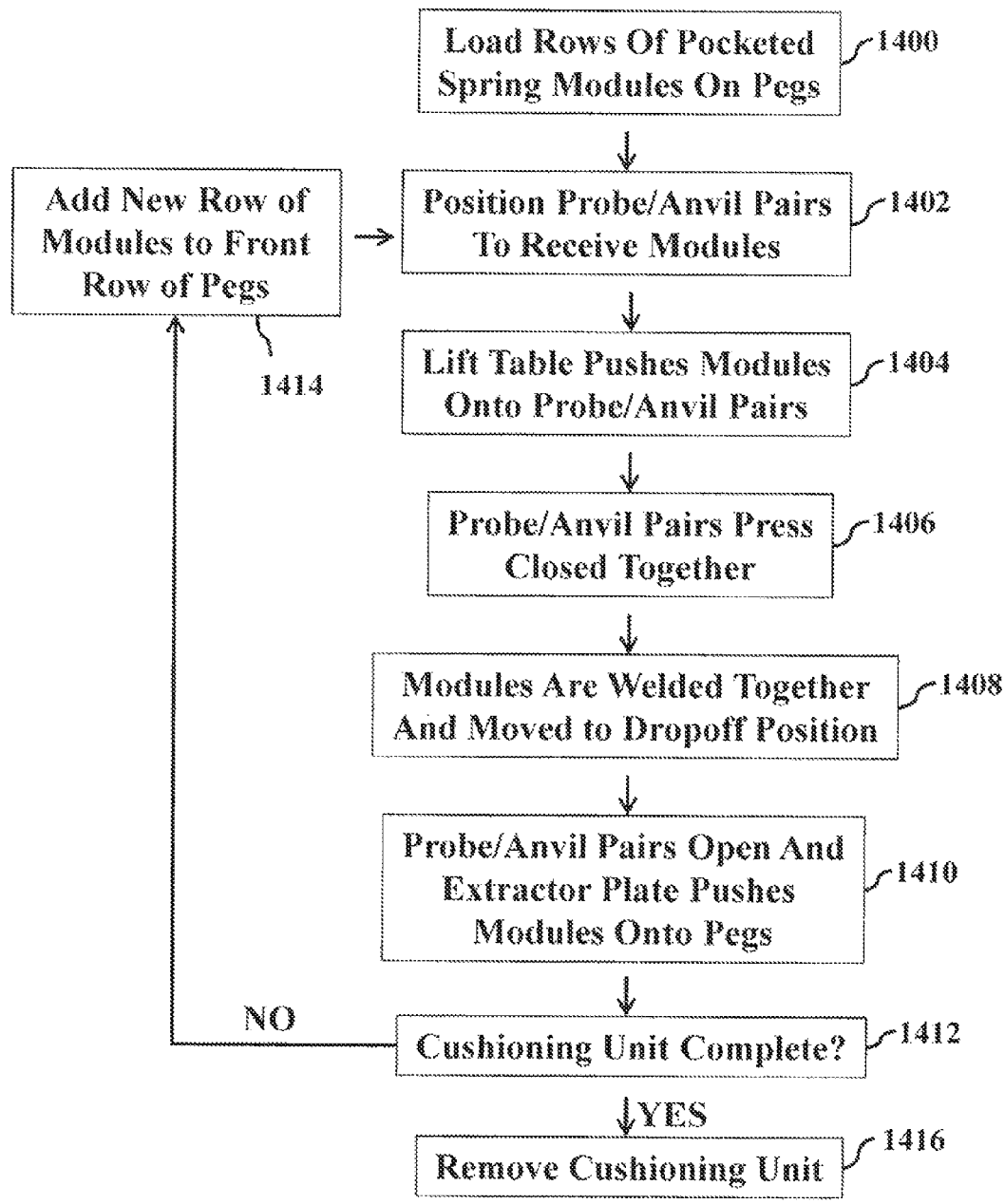
FIG. 12 shows an example of a process for welding rows of pocketed spring modules together.

FIG. 12 shows an example of a process for welding rows of pocketed spring modules 200 to each other. Pocketed spring modules 200 are loaded onto rows of pegs 102 in step 1400. Paired probes 110 and anvils 112 (preferably arranged in rows) are positioned over the pegs 102 to receive the modules 200 in step 1402. The liftable table 106 then pushes the modules 200 onto the probes 110 and anvils 112 in step 1404, and the probes 110 and anvils 112 are pressed closed, with pocket material pressed between them 1406.

The probes 110 and anvils 112 (preferably still closed together) move the modules 200 to a dropoff position while welding the rows of modules 200 together using a welding pulse through the respective heating elements 302 in step 1408. Once the dropoff position is reached and the weld is completed, the probes 110 and anvils 112 open (move apart), the probes 110 are vertically aligned with the far row of pegs 102, and the extractor plate 124 pushes the modules 200 onto the pegs 102 in step 1410. Depending on whether the cushioning unit is planned to have more rows of modules 200 welded on (is not complete) 1412, a new row of modules 200 is added to the front row of pegs 102 at step 1414, and the process repeats from step 1402; or, if welding of rows of modules to form the cushioning unit is complete, then the cushioning unit can be removed from the assembly mechanism 1416.

Alternatively, if the cushioning unit is complete at step 1412, the modules 200 can be moved to a dropoff position away from the pegs 102, so that the cushioning unit can easily be removed from the assembly mechanism 1418 (this behavior can be built into the assembly mechanism).

FIGS. 13A and 13B schematically show a sealing head 300. Preferably, a sealing head 300 comprises a probe 110 with a heating element 302 (see FIGS. 14A and 14B) that will heat up when current is passed through it; an anvil 112, with a contact region 304 that is preferably detachable to allow reconfiguration (e.g., to one or more contact regions of varied and/or multiple separate vertical extent(s) and/or widths, by which size, shape and number of welds generated in a single weld event can be configured); and a mechanism for pushing the probe 110 and anvil 112 together for a weld, here a set of rails 116 as described above. A sealing head 300 can also include a timer interface 306 to control and/or display the duration of a welding pulse of current, and a pressure interface 308 to control and/or display the amount of pressure the probe 110 and anvil 112 will exert against the fabric during a weld.

FIG. 13A shows the sealing head 300 with the probe 110 and anvil 112 in an open position (the heating element 302 is pointed out, but is not visible due to probe 110 orientation). FIG. 13B shows the sealing head 300 with the probe 110 and anvil 112 in a closed position FIG. 14A schematically shows a probe 110. FIG. 14B schematically shows an exploded view of a probe 110.

A length of non-stick material 402 (or a length of tape and/or other structural material(s) that are coated with non-stick material) overlays the heating element 302 (or is otherwise connected to the probe 110 and arranged) so that it is interposed between the heating element 302 and pocket spring fabric of a module 200 when a weld occurs. The non-stick material 402 prevents the heating element 302 from sticking to the (melted) pocket spring fabric. (The heating element 302 is referred to herein as being in "contact" with the fabric during a weld, regardless of whether non-stick material is interposed therebetween.)

One end of the heating element 302 is connected on each of a top portion 404 and a bottom portion 406 of the probe 110 (and to an electrical power source). The top portion 404 and bottom portion 406 are aligned by metal bars 408 that insert into holes in the bottom portion 406. A spring 410 allows the top portion 402 and bottom portion 404 to be pushed apart and pulled together by expansion and contraction of the heating element 302 as a result of heating and cooling. Preferably, the non-stick material is glued (or otherwise attached) to only one portion, i.e., either the top portion 404 or the bottom portion 406.

In the example embodiment shown in FIGS. 14A and 14B, the probe 110 also comprises cover plates 412.

As shown, the heating element 302 wraps around the end of the bottom portion 406 of the probe 110 (the bend in the heating element 302 conforms to the shape of the bottom end of the probe 110) to facilitate contact between the heating element 302 and the full vertical extent of pocket spring fabric of a module 200, enabling welding of said full vertical extent in one welding event. Width and thickness of a heating element 302 can be selected based on, e.g., width of the probe 110; width and/or depth of the channel 414 (if any) in the probe 110 surface that the heating element 302 is disposed in; desired or maximum weld width; and desired resistivity (e.g., for temperature and/or efficiency control). Use of a channel 414 in which to recess the heating element 302 is preferred, e.g., to help control location and timing of a weld by preventing contact with and/or pressure of the heating element 302 on pocket spring fabric at a location where (or at a time when) a weld is not desired (or for a duration longer than desired). As shown, the channel 414 is defined on an anvil-facing side 416 of the probe 110 by the cover plates 412.

The body 418 of the probe (at least, the portion near the heating element 302 and electrical connections thereto) is preferably made from a poor electrical and thermal conductor (e.g., an insulator), such as G7 Garolite (a high-temperature composite).

FIG. 15 schematically shows an anvil 112. The connecting portion 420 of the anvil 112 connects to the rest of the sealing head 300. The anvil body 422 holds a contact region 304. When the anvil 112 and probe 110 close together to weld, the contact region 304 presses flush against the heating element 302. The contact region 304 can be made of, for example, rubber.

"Contact region" 304 refers to that portion of the anvil 112 located and shaped to press flush against the heating element 302 in at least one location corresponding to a desired weld location on module pocket spring fabric pressed between the probe 110 and anvil 112.

One "welding event" refers to the weld(s) formed by the one or more probe 110/anvil 112 pairs that contemporaneously receive a single welding pulse of current each, without the probes 110 and anvils 112 being removed from the holes 202 of the rows of modules 200 during the period of the welding event.

Figure 16:
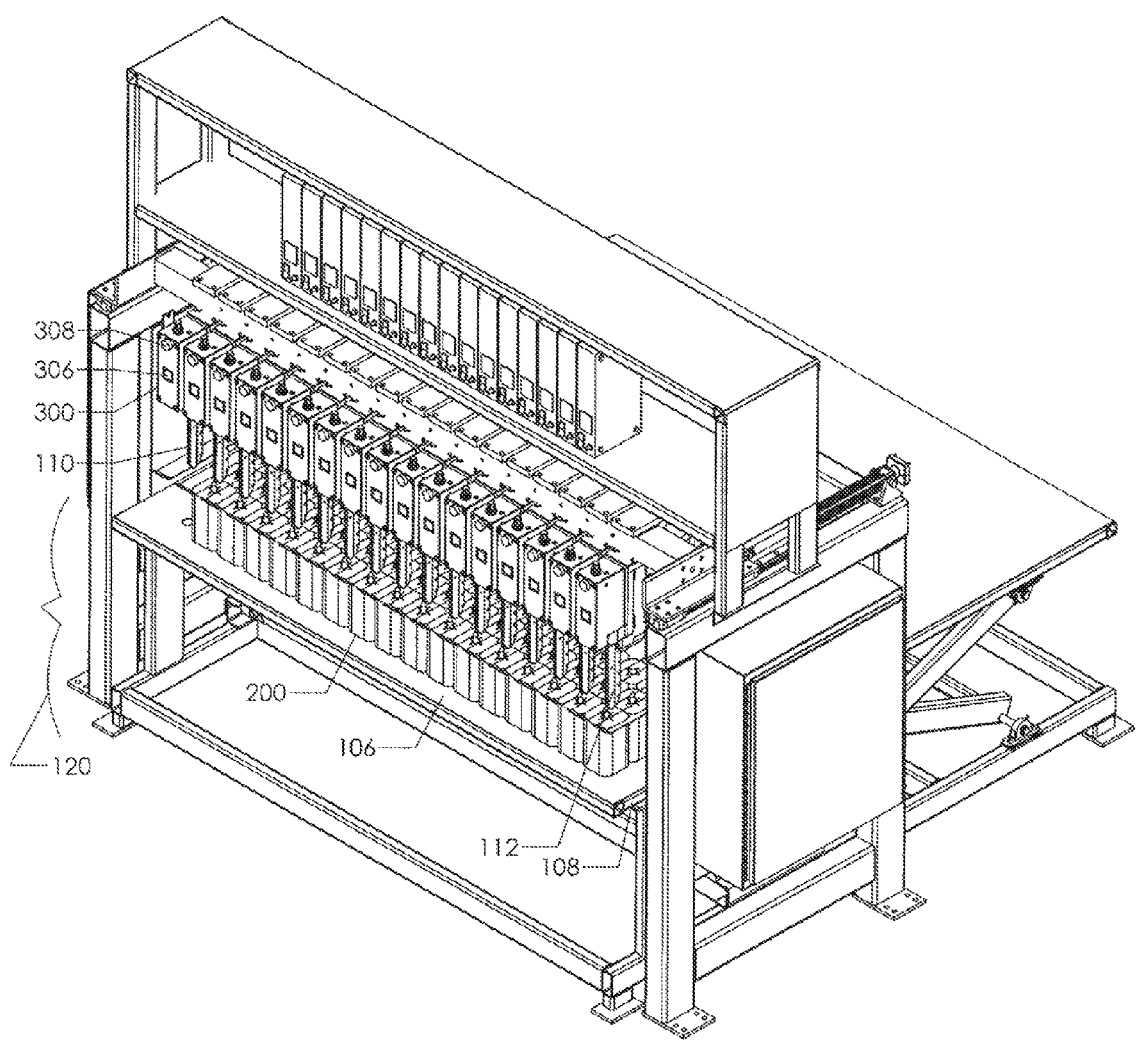
FIG. 16 schematically shows a machine for welding rows of pocketed spring modules to each other.

FIG. 16 schematically shows a machine for welding rows of pocketed spring modules 200 to each other.

According to some but not necessarily all embodiments, there is provided: A method for glueless assembly of cushioning units, comprising: a) inserting one of at least one probe/anvil pair into openings in a first continuous row of connected multiple-coil modules, and inserting the other of said probe/anvil pair into openings in a second continuous row of connected multiple-coil modules, individual ones of said modules comprising more than two pocketed springs which together surround one of said openings, individual ones of said pocketed springs each comprising a spring inside a pocket made of a flexible material; b) moving said probe/anvil pair together such that at least one contact region on said anvil presses said material against at least one heating element connected to said probe, and applying current across said heating element to thereby weld said first and second rows of multiple-coil modules together; c) removing at least one of said first and second rows of modules from said probe/anvil pair; and repeating said steps (a), (b) and (c) until more than two rows of modules have been thereby welded together to form a cushioning structure having an extended area.

According to some but not necessarily all embodiments, there is provided: A mechanism for glueless assembly of pocketed spring units, comprising: at least one probe and at least one anvil, said probe and anvil configured to be inserted into openings in pocketed spring modules, individual ones of said modules comprising more than two pocketed springs which together surround one of said openings, and individual ones of said pocketed springs each comprising a spring inside a pocket made of a flexible material; said anvil having at least one contact region configured to press flush against said heating element when said probe and anvil are closed together; and at least one heating element mounted on an anvil-facing side of said probe and configured to thermally weld pocketed spring fabric when said probe and said anvil press together and current is propagated through said heating element.

According to some but not necessarily all embodiments, there is provided: A method for glueless assembly of cushioning units, comprising: a) inserting multiple double-rows of probe/anvil pairs into openings in multiple continuous rows of connected multiple-coil modules, ones of said pairs in ones of said double-rows inserting into openings in ones of said rows of modules, others of said pairs inserting into openings in adjacent ones of said rows of modules, different double-rows of probe/anvil pairs inserting into different twos of said rows of modules; wherein individual ones of said modules comprise more than two pocketed springs which together surround one of said openings, and wherein individual ones of said pocketed springs each comprise a spring inside a pocket made of a flexible material; b) moving said probe/anvil pairs together such that said anvils press said material against at least one heating element disposed along a facing side of corresponding ones of said probes, and applying current across said heating element to thereby weld said pairs of rows of multiple-coil modules together; c) removing said pairs of rows of modules from said double-rows of probe/anvil pairs; and d) repeating step a) such that said double-rows of probe/anvil pairs are inserted into different twos of said rows of modules that were not welded together in step b), and then repeating step b); wherein said rows of modules are sufficient to form a pocketed spring component of a mattress, and whereby said rows of modules are welded together in two welding events.

According to some but not necessarily all embodiments, there is provided: A mechanism for glueless assembly of pocketed spring units, comprising: multiple alternating rows of probes and anvils, said probes and anvils configured to be inserted into openings in pocketed spring modules, individual ones of said modules comprising more than two pocketed springs which together surround one of said openings, and individual ones of said pocketed springs each comprising a spring inside a pocket made of a flexible material; ones of said anvils having at least one contact region on at least two probe-facing sides, said contact regions configured to press flush against said heating element when said probe and anvil are closed together; and at least one heating element mounted on each of the anvil-facing sides of ones of said probes and configured to thermally weld pocketed spring fabric when ones of said probes and ones of said anvils press together and current is propagated through said heating element.

According to some but not necessarily all embodiments, there is provided: A method for glueless assembly of pocketed spring units, comprising: a) inserting multiple alternating rows of probes and anvils into corresponding openings in multiple continuous rows of connected multiple-coil modules, individual ones of said modules comprising more than two pocketed springs which together surround one of said openings, individual ones of said pocketed springs each comprising a spring inside a pocket made of a flexible material; b) moving adjacent pairs of said probes and anvils together such that said anvils press said material against at least one heating element disposed along facing sides of said probes, and applying current across said heating elements to thereby weld together pairs of modules in said rows of modules; and c) repeating said moving such that said probes and anvils close together with the other adjacent anvil or probe, and repeating said applying current to thereby weld together different pairs of modules in said rows of modules.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

As used herein and as is apparent from the disclosure set forth hereinabove, "left" and "right" (and "front" and "far") are arbitrary terms signifying generally opposing directions, respectively oriented towards pre-weld (generally, welding machine entrance) and post-weld (generally, welding machine exit) pocketed spring module positions as shown in FIGS. 1-10.

In some embodiments, the probes and anvils start in different positions than shown in FIG. 1.

In some embodiments, probe/anvil pairs move the rows of modules over to a dropoff position once the modules are fully off of the pegs; in some embodiments, once the modules are fully loaded onto the probe/anvil pairs; in some embodiments, at some (or any) time between.

In some embodiments, a pocketed springs in a row of pocketed springs may be connected to each other by material other than the material used to form pockets.

In some embodiments, pocketed springs may be formed by welding pocketed springs to a strip or strips of flexible material (e.g., the material used to form pockets).

In some embodiments, different lengths or portions of the probe may have one or more separate heating elements.

In some embodiments, multiple separate heating elements are side-by-side in a probe.

In some embodiments, rows of pocketed spring modules can be automatically fed onto rows of pegs.

In some embodiments, rows of pocketed spring modules can be manually fed onto rows of pegs.

In some embodiments, the probes and anvils are moved leftward and rightward together (or separately) by the same transportation system that pushes them together and apart for welding.

In some embodiments, lifting mechanisms other than servo motors are used to lift the liftable table, such as hydraulic motors.

In some embodiments, other transportation types (than rails) and motor types are used to move the probes left-wards and right-wards, and together and apart, than described hereinabove.

In some embodiments, the probe moves to the anvil to press flush against the anvil prior to welding.

In some embodiments, the anvil moves to the probe to press flush against the probe prior to welding.

In some embodiments, the probe and anvil both move to press flush against each other prior to welding.

In some embodiments, probe/probe pairs are used.

The probe is described herein with a particular internal structure that compensates for expansion of the heating element during a weld. In some embodiments, the probe has a different structure that compensates for expansion of the heating element during a weld, e.g., using a flexible/mobile attachment between the heating element and the probe.

In some embodiments, expansion of the heating element is minimized and the internal structure of the probe is simplified.

In some embodiments, one or more welds is performed as described above; or when the liftable table has not fully transferred the modules to the probe/anvil pairs; or when a portion of the modules has been pushed above the top(s) of the heating element(s); or after complete transferal, before, during or after moving the modules to a dropoff position; or during dropoff; or some or any combination thereof.

In some embodiments in which probes have more than one heating element, different ones of the heating elements can be activated separately.

In some embodiments, the probes and/or anvils push the modules into a dropoff position while the probes and anvils are separated from each other (open).

In some embodiments, something other than the probes and/or anvils (e.g., a pusher rod or plate) moves the modules into a dropoff position.

Particular left/right orientations of the probe and anvil have been described and shown with respect to the disclosed inventions. It will be apparent to one of ordinary skill in the arts of machine engineering of manufacturing machinery that alternative orientations of probe/anvil pairs are possible; e.g., reversed orientation (probes switched with anvils); or at +/−30 degrees from the front-ward/far-ward axis of the welding machine (the latter orientation(s), for example, to weld rows of hexagonal 6-pocketed spring modules together); or orthogonally to a feed axis of the welding machine (e.g., to weld disjoint subrows of modules together).

It will also be apparent to said person of ordinary skill that double rows of probe/anvil pairs need not be fully segregated (i.e., that a row can consist of both probes and anvils).

In some embodiments, probe/anvil pairs and/or rows of pegs can be arranged otherwise than in orderly rows.

In some embodiments, heating element(s) in a probe and contact region(s) in an anvil are located at, at part of, or including where the probe presses against the anvil (with the fabric between them).

In some embodiments, one or more probe/anvil pairs can be configured to open and close at different times from other probe/anvil pairs.

In some embodiments, different probe/anvil pairs can be caused to weld at different vertical positions.

In some embodiments, for some welding events, some of the probes, and/or some of the heating elements in some of the probes, are not transmitted a welding pulse of current.

In some embodiments, probe/anvil pairs can close at different times from each other.

In some embodiments, probes have more than two respectively movable, spring-loaded (or similarly movement-restrained) portions.

In some embodiments, different probes can be transmitted different welding pulses (e.g., to create different strength welds).

In some embodiments, probes have multiple heating elements in different vertical locations.

In some embodiments, different heating elements in different probes, or in a single probe, have different widths, lengths and/or resistivities.

In some embodiments, the resistivity of a heating element varies along its length.

In some embodiments, the resistivity of a heating element varies laterally (across its width).

In some embodiments, anvils have multiple contact regions in different vertical locations.

In some embodiments, anvils have multiple contact regions side-by-side with each other.

In some embodiments, different contact regions in different anvils, or in a single anvil, have different widths and/or lengths.

In some embodiments, hybrid probe/anvil phalanges, individual phalanges having both heating element and contact region portions, can be used. In some embodiments, a hybrid probe/anvil phalange can have a heating element on one side, and a contact region on another (e.g., opposite-facing) side.

In some embodiments, rather than a pressure switch, an eye or other sensing device is used to determine when to transmit the (current) welding pulse and start the timer for welding pulse duration.

In some embodiments, welding pulse start timing is controlled based on when the probe and anvil close together, rather than or in addition to a sensing device. Other strategies can also be used to control welding pulse start timing.

In some embodiments, different vertical positions and extents where a probe and anvil press flush together can be controlled to be under different amounts of pressure.

In some embodiments, heating elements are coated with a high temperature non-stick material. In some embodiments, a high temperature non-stick material overlays, rests upon, is attached to, sheathes, or surrounds a heating element, or otherwise interposes between the heating element and the fabric during a weld.

In some less preferred embodiments, non-stick material is not used.

Particular up/down orientations have been described hereinabove with respect to, e.g., the lifting table and extractor plate. It will be apparent to one of ordinary skill in the arts of machine engineering of manufacturing machinery that alternative orientations (rather than along a z axis, or along an axis inverted from that described herein) are possible.

In some embodiments (and preferably), the springs are in the pockets prior to welding.

In some embodiments, as will be apparent to those of ordinary skill in the arts of machine engineering of manufacturing machinery, contact regions on anvils can be made of various materials.

In some embodiments, three or more rows of pocketed springs are welded together substantially simultaneously.

In some embodiments welding three rows of modules together substantially simultaneously, for a line of modules containing one module from each row, two pairs of probes and anvils perform welds at a given horizontal position; in other such embodiments, an anvil moves sequentially to two different probes at a given horizontal position; in other such embodiments, a probe moves sequentially to two different anvils at a given horizontal position.

In some embodiments, probes have heating elements on both anvil-facing sides. In some embodiments, anvils have contact regions on both probe-facing sides. In some such embodiments, one or both exterior (most front-ward and most far-ward) rows of probes and/or anvils has heating elements and/or contact regions on only one side of some or all of the probes and/or anvils in said row(s).

In some embodiments, two probes or anvils, or a probe and an anvil, are inserted into openings in modules, and rows of modules are welded to both adjacent rows of modules simultaneously.

In some embodiments, a weld is performed while the probes and anvil are moving relative to the rows of pegs.

In some embodiments in which the upholstery comprises rows of pocketed microcoil springs, the core can be of a type other than pocketed springs, e.g., continuous coils.

In some embodiments, rows of modules comprise disjoint subrows of modules, such that two disjoint subrows of modules are not connected to each other.

In some embodiments using disjoint subrows of modules, disjoint subrows comprising a first row are connected to each other when they are welded to a full row of modules, or welded to a subrow of modules that is disjoint from other subrow(s) of modules comprising a corresponding second row at a location that is not aligned with the disjunction(s) in the first row.

In some embodiments using disjoint subrows of modules, disjoint subrows are connected to form a non-disjoint row of modules by welding pocket fabric of disjoint subrows at the location of the disjunction.

In some embodiments, a row of pocketed springs (not modules) is configured to be positioned by pegs and welded to another row of pocketed springs (not modules); for example, using openings described by cylinders (open at top and bottom) or rings formed from excess pocketed spring fabric, or welded onto the rows of pocketed springs. In some such embodiments, each said row of pocketed springs is itself a doubled row of pocketed springs.

In some embodiments, the liftable table comprises only sufficient structure to transfer the rows of modules from the locator pins to the probe/anvil pairs, or is a continuous structure except where penetrated by locator pins, and can generally be anything between (e.g., a set of parallel strips, or strips in a criss-cross pattern, or any other shape or pattern capable of pushing rows of modules from the locator pins onto the probe/anvil pairs). In some embodiments, rows of modules are supported by a stationary or separately movable resting table in addition to or instead of the liftable table when the liftable table is at a position where rows of modules are fully loaded onto the locator pins (or at a lowest position).

Preferably one "module" of pocketed springs includes exactly four pocketed springs which totally surround a vertical opening which extends for the full height of a pocketed spring. However, in alternative and less preferred embodiments, more or fewer pocketed springs can be used to define a single module.

In some embodiments, pocketed spring modules comprise pocketed springs having uniform coil-to-coil distance in a length direction of the cushioning unit, and different uniform coil-to-coil distance in a width direction of the cushioning unit.

In some embodiments, a weld is be performed on four or more layers of pocket fabric, e.g., if the modules are formed from pairs of rows of pocketed springs welded together, and the rows of pocketed springs are pocketed in pockets formed from a long single sheet of fabric doubled over width-wise.

The pockets which will contain the springs can be formed, for example, from a continuous strip of folded polymer material. Welds are formed across this strip to separate the pockets from each other. As noted above, the pockets preferably have openings on their sides where a flattened coil spring can be inserted and released; once the coil spring is allowed to expand into the pocket, its ends will stay at the ends of the pocket.

Two such strips can then be welded together at every other weld location. This produces a strip of modules, where each module includes four pocketed spring units surrounding an opening. Such a strip of modules is shown in FIG. 2 and the following figures.

Optionally the strip of modules can be trimmed to the desired width (or length) of the finished structure before the steps of FIGS. 1-10 are performed. However, alternatives are possible, as will be readily recognized by those of ordinary skill in the arts of machine engineering of manufacturing machinery.

In some embodiments, alternative shapes can be used for the extractor plate, such as multiple extractor fingers, or an extractor rod parallel to the table and to the axis formed by a row of modules (i.e., from one end of the row to the other end of the row).

In some embodiments, a far edge (or more) of a front row of modules located on the probes is under the extractor plate when the front row of modules is in position to be transferred to the far row of pegs.

In some embodiments, the extractor plate is shaped to push on different portions of the front and far rows of modules than described above.

In some embodiments, a manual or automated mechanism other than a crank can be used to control the height of the table. In some embodiments, a crank or other mechanism can be used to control the height of the extractor plate.

In some embodiments, multiple welds for rows of modules are performed substantially simultaneously; in some embodiments, welds for said rows are (or can be) performed sequentially.

In some embodiments, pockets have insertion slots in the side.

In some embodiments, pocket material is a sheet of flexible polymer.

In some embodiments, coil springs have non-uniform (but known) diameter.

In some embodiments, coil springs have non-uniform (but known) spacing from each other.

In some embodiments, all rows of modules are transferred from the pegs to the probes and anvils substantially simultaneously.

In some embodiments, pegs are steel, and have approximately frustoconical tips. In some embodiments, pegs have other conical, prismatic, or otherwise much-longer-than-wide and approximately straight shapes, with tips configured to penetrate modules' central openings (e.g., square prism with a hemispherical tip).

In some embodiments, the liftable table and extractor plate can move separately.

In some embodiments, the extractor plate is mechanically connected to the liftable table at an adjustable distance therefrom.

In some embodiments, probe/probe pairs (both probes having current-heated wires, which press against each other with fabric between) are used to form welds; in which case, probes can be configured to act as both probes and anvils.

Additional general background, which helps to show variations and implementations, may be found in the following publications, all of which are hereby incorporated by reference: U.S. Pat. No. 5,772,100; U.S. Pat. No. 3,844,869; U.S. Pat. No. 4,234,983; U.S. Pat. No. 4,401,501; U.S. Pat. No. 6,131,892; U.S. Pat. No. 6,260,331; U.S. Pat. No. 6,347,423; U.S. Pat. No. 6,101,697; U.S. Pat. No. 6,021,627; U.S. Pat. No. 5,613,287; U.S. Pat. No. 5,553,443; U.S. Pat. No. 4,439,977; U.S. Pat. No. 4,485,506; U.S. Pat. No. 5,749,133; U.S. Pat. No. 5,613,287; U.S. Pat. No. 4,986,518; U.S. Pat. No. 4,906,309; U.S. Pat. No. 4,854,023; U.S. Pat. No. 4,523,344; U.S. Pat. No. 4,234,984; U.S. Pat. No. 3,251,078; U.S. Pat. No. 2,540,441; U.S. Pat. No. 1,226,219; U.S. Pat. No. 1,192,510; and U.S. Pat. No. 685,160; and published U.S. patent applications 20120311784, 20120091644, 20110191962, 20110107572, 20100218318, 20100212090, and 20080245690.

Additional general background, which helps to show variations and implementations, as well as some features which can be implemented synergistically with the inventions claimed below, may be found in the following US patent applications. All of these applications have at least some common ownership, copendency, and inventorship with the present application, and all of them, as well as any material directly or indirectly incorporated within them, are hereby incorporated by reference: U.S. Pat. No. 6,131,892; U.S. Pat. No. 6,260,331; U.S. Pat. No. 6,347,423; and U.S. patent application Ser. No. 14/158,811.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A method for glueless assembly of cushioning units, comprising:
    a) inserting one of at least one probe/anvil pair into openings of a first continuous row of connected multiple-coil modules, and inserting the other of said probe/anvil pair into openings of a second continuous row of connected multiple-coil modules, individual ones of said modules comprising more than two pocketed springs which together surround one of said openings, individual ones of said pocketed springs each comprising a spring inside a pocket made of a flexible material;
    b) moving said probe/anvil pair together such that at least one contact region on said anvil presses said material against at least one heating element connected to said probe, and applying current across said heating element to thereby weld said first and second rows of multiple-coil modules together;
    c) removing at least one of said first and second rows of modules from said probe/anvil pair; and
    repeating said steps (a), (b) and (c) until more than two rows of modules have been thereby welded together to form a cushioning structure having an extended area.

2. The method of claim 1, wherein pressure applied by said probe/anvil pair to said flexible material is different for different vertical extents of said flexible material.

3. The method of claim 1, wherein at least one of the following characteristics of said heating element and/or said contact region is selectable: conductivity, vertical extent, vertical location, width, lateral location, number, resistivity of said heating element, and thickness of said contact region.

4. The method of claim 1, wherein adjacent modules are welded together in both length and width directions of the cushioning unit, and wherein multiple probe/anvil pairs are used and said probe/anvil pairs perform step b) substantially simultaneously.

5. A cushioning unit manufactured by the method of claim 1.

6. The method of claim 1, wherein said heating element and said contact region press together and weld along the full vertical extent of said module in a single welding event.

7. The method of claim 1, wherein said anvil pressing said material against said heating element comprises pressing said material into a channel on said probe into which said heating element is recessed.

8. A mechanism for glueless assembly of pocketed spring units, comprising:
    at least one probe and at least one anvil, said probe and anvil configured to be inserted into openings of pocketed spring modules, individual ones of said modules comprising more than two pocketed springs which together surround one of said openings, and individual ones of said pocketed springs each comprising a spring inside a pocket made of a flexible material;
    said anvil having at least one contact region configured to press flush against said heating element when said probe and anvil are closed together; and
    at least one heating element mounted on an anvil-facing side of said probe and configured to thermally weld pocketed spring fabric when said probe and said anvil press together and current is propagated through said heating element.

9. The mechanism of claim 8, wherein said heating element is recessed within a channel on said anvil-facing side of said probe, and said contact region is configured to press said material into said channel.

10. The mechanism of claim 8, wherein said probe further comprises at least two connected, respectively movable portions, at least two of said portions connected to said heating element, said portions configured to move apart when said heating element expands, and move together when said heating element contracts.

11. The mechanism of claim 8, wherein said heating element wraps over a top edge and/or a bottom edge of said probe and a vertical extent of said heating element extends to at least one edge of said modules.

12. The mechanism of claim 8, wherein said heating element extends the full vertical length of said modules.

13. The mechanism of claim 8, further comprising:
a transport configured to move at least one of said probe and said anvil to close together and open apart;
at least two rows of locator pins which protrude through a lifting table; and
said lifting table, configured to transfer multiple rows of pocketed spring modules from said locator pins to at least one double-row of probe/anvil pairs, ones of said probe/anvil pairs comprising ones of said probes paired with ones of said anvils.

14. The mechanism of claim 8, further comprising a non-stick material connected to said probe and overlaying an anvil-facing surface of said heating element.

15. A method for glueless assembly of cushioning units, comprising:
a) inserting multiple double-rows of probe/anvil pairs into openings in multiple continuous rows of connected multiple-coil modules, ones of said pairs in ones of said double-rows inserting into openings in ones of said rows of modules, others of said pairs inserting into openings in adjacent ones of said rows of modules, different double-rows of probe/anvil pairs inserting into different twos of said rows of modules; wherein individual ones of said modules comprise more than two pocketed springs which together surround one of said openings, and wherein individual ones of said pocketed springs each comprise a spring inside a pocket made of a flexible material;
b) moving said probe/anvil pairs together such that said anvils press said material against at least one heating element disposed along a facing side of corresponding ones of said probes, and applying current across said heating element to thereby weld said pairs of rows of multiple-coil modules together;
c) removing said pairs of rows of modules from said double-rows of probe/anvil pairs; and
d) repeating step a) such that said double-rows of probe/anvil pairs are inserted into different twos of said rows of modules that were not welded together in step b), and then repeating step b);
wherein said rows of modules are sufficient to form a pocketed spring component of a mattress, and whereby said rows of modules are welded together in two welding events.

16. A cushioning unit manufactured by the method of claim 15.

17. The method of claim 15, wherein said heating element and said contact region press together and weld along the full vertical extent of said module in a single welding event.

18. The method of claim 15, wherein said anvil pressing said material against said heating element comprises pressing said material into a channel on said probe into which said heating element is recessed.

19. The method of claim 15, wherein said double-rows weld together multiple pairs of said continuous rows of modules substantially simultaneously.

20. The method of claim 15, wherein at least one of the following characteristics of said heating element and/or said contact region is selectable: conductivity, vertical extent, vertical location, width, lateral location, number, resistivity of said heating element, and thickness of said contact region.

* * * * *